US012689979B2

(12) United States Patent
Zhang et al.

(10) Patent No.: US 12,689,979 B2
(45) Date of Patent: Jul. 21, 2026

(54) CHANNEL STATE INFORMATION MEASUREMENT METHOD, AND APPARATUS

(71) Applicant: HUAWEI TECHNOLOGIES CO., LTD., Shenzhen (CN)

(72) Inventors: Di Zhang, Shenzhen (CN); Shengyu Li, Beijing (CN); Kunpeng Liu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 301 days.

(21) Appl. No.: 18/519,544

(22) Filed: Nov. 27, 2023

(65) Prior Publication Data

US 2024/0098635 A1     Mar. 21, 2024

Related U.S. Application Data

(63) Continuation of application No. PCT/CN2022/092702, filed on May 13, 2022.

(30) Foreign Application Priority Data

May 31, 2021   (CN) .......................... 202110604622.5

(51) Int. Cl.
*H04W 24/10* (2009.01)
*H04W 52/02* (2009.01)

(52) U.S. Cl.
CPC .............................. *H04W 52/0206* (2013.01)

(58) Field of Classification Search
CPC ......... H04W 52/0206; H04W 52/0245; H04W 52/028; H04W 24/10; H04B 7/0626;
(Continued)

(56) References Cited

U.S. PATENT DOCUMENTS

| | | | |
|---|---|---|---|
| 2012/0213261 A1* | 8/2012 | Sayana | ................. H04L 5/0094 375/224 |
| 2014/0092826 A1* | 4/2014 | Eriksson | ............... H04L 5/0053 370/329 |

(Continued)

FOREIGN PATENT DOCUMENTS

CN          109196905 A      1/2019

OTHER PUBLICATIONS

Extended European Search Report issued in corresponding European Application No. 22815010.8, dated Sep. 26, 2024, pp. 1-11.

(Continued)

*Primary Examiner* — Phuc H Tran
(74) *Attorney, Agent, or Firm* — HAUPTMAN HAM, LLP

(57) ABSTRACT

This application provides a channel state information measurement method, to enable a network device to dynamically adjust a quantity of transmit channels, thereby reducing energy consumption of the network device. The network device sends reference signal resource configuration information to a terminal device, where the reference signal resource configuration information indicates P antenna ports. The terminal device measures CSI based on one or more proper subsets of antenna ports in a universal set of the P antenna ports, and sends the CSI to the network device. The network device can dynamically adjust the quantity of transmit channels based on different dimensions of channel state information reported by the terminal device, thereby reducing energy consumption of the network device.

20 Claims, 6 Drawing Sheets

(58) Field of Classification Search
CPC ..... H04B 7/0691; H04L 5/0057; H04L 5/005;
H04L 5/0094; H04L 5/0023; H04L
5/0048; Y02D 30/70
See application file for complete search history.

(56) References Cited

U.S. PATENT DOCUMENTS

| | | |
|---|---|---|
| 2018/0175983 A1 | 6/2018 | Yum et al. |
| 2019/0349057 A1 | 11/2019 | Davydov et al. |
| 2024/0172025 A1* | 5/2024 | Li .............................. H04L 1/06 |

OTHER PUBLICATIONS

Australian Office Action issued in corresponding Australian Application No. 2022284108, dated Aug. 21, 2024, pp. 1-3.

* cited by examiner

CHANNEL STATE INFORMATION MEASUREMENT METHOD, AND APPARATUS

CROSS-REFERENCE TO RELATED APPLICATIONS

This application is a continuation of International Application No. PCT/CN2022/092702, filed on May 13, 2022, which claims priority to Chinese Patent Application No.202110604622.5, filed on May 31, 2021, the disclosures of the aforementioned applications are hereby incorporated by reference in their entireties.

TECHNICAL FIELD

One or more embodiments of the present application relate to the wireless communication field, and in particular, to a channel state information measurement method, and an apparatus.

BACKGROUND

In a communication process, a base station performs resource scheduling based on channel state information (channel state information, CSI) reported by a terminal. To save energy, the base station may shut down some transmit channels, thereby reducing energy consumption of the base station.

SUMMARY

One or more embodiments of the present application provide a CSI measurement method, to enable a network device to dynamically adjust a quantity of transmit channels, thereby reducing energy consumption of the network device.

According to a first aspect, this application provides a CSI measurement method. A terminal device receives reference signal resource configuration information from a network device. The reference signal resource configuration information indicates a first reference signal resource. The first reference signal resource includes P antenna ports. P is a positive integer. The terminal device sends first information. The first information includes M pieces of CSI that are in a one-to-one correspondence with M antenna port sets. An antenna port included in any one of the M antenna port sets belongs to the P antenna ports. M is a positive integer. A quantity of antenna ports included in at least one of the M antenna port sets is less than P.

In some embodiments, the terminal device can obtain, by using the first reference signal resource, CSI of an antenna port set that includes antenna ports whose quantity is less than a total quantity of antenna ports, and report the CSI to the network device. In this way, the network device determines whether to enter an energy-saving mode, or determines a quantity of transmit channels to be used to send a signal. Therefore, the network device is enabled to dynamically adjust a quantity of transmit channels, thereby reducing energy consumption of the network device.

In some embodiments, M is an integer greater than or equal to 2. Different antenna port sets include different quantities of antenna ports. Alternatively, different antenna port sets include a same quantity of antenna ports, but include antenna ports that are not completely the same or completely different. In this implementation, the terminal device reports CSI of a plurality of dimensions (that is, a plurality of antenna port sets), to improve accuracy that the network device determines whether to enter the energy-saving mode or determines the quantity of transmit channels to be used to transmit the signal.

In some embodiments, the M antenna port sets are protocol-predefined. The antenna port included in any one of the M antenna port sets is an antenna port in the P antenna ports.

In some embodiments, the M antenna port sets are M antenna port sets in N antenna port sets. The N antenna port sets are protocol-predefined. An antenna port in any one of the N antenna port sets is an antenna port in the P antenna ports. N is an integer greater than M.

In some embodiments, the terminal device receives first indication information. The first indication information indicates N antenna port sets. The M antenna port sets are M antenna port sets in the N antenna port sets. N is an integer greater than or equal to M. An antenna port in any one of the N antenna port sets is an antenna port in the P antenna ports.

In some embodiments, the terminal device receives second indication information. The second indication information indicates a CSI measurement mode. The CSI measurement mode includes a mode 1 or a mode 2. The mode 1 is that CSI is measured based on at least a part of the P antenna ports. The mode 2 is that CSI is measured based on all the P antenna ports.

In some embodiments, the terminal device determines the M antenna port sets based on a first threshold. The first threshold is indicated by third indication information. Alternatively, the terminal device determines the M antenna port sets based on channel quality of the N antenna port sets.

In some embodiments, the terminal device receives second indication information. The second indication information indicates the M antenna port sets, or the second indication information indicates X antenna ports in the P antenna ports. The antenna port in the M antenna port sets is an antenna port in the X antenna ports, or the antenna port in the M antenna port sets is an antenna port in the P antenna ports except the X antenna ports.

In some embodiments, the second indication information indicates a second resource in the first reference signal resource. The second resource corresponds to the M antenna port sets, or the second resource corresponds to the X antenna ports.

In some embodiments, the second indication information indicates indexes of the X antenna ports in the P antenna ports, or the second indication information indicates indexes of the M antenna port sets.

In some embodiments, the first information includes M first bit fields. A $K1^{th}$ first bit field in the M first bit fields indicates CSI of a first antenna port set in the M antenna port sets. A $K2^{th}$ first bit field in the M first bit fields indicates CSI of a second antenna port set in the M antenna port sets. K1 and K2 are positive integers less than or equal to M, and K1 is less than K2. A quantity of antenna ports included in the first antenna port set is greater than or equal to a quantity of antenna ports included in the second antenna port set.

In some embodiments, the terminal device indicates the M pieces of CSI by using the M first bit fields one by one in the first information. The M first bit fields are sorted in descending order of quantities of antenna ports in corresponding antenna port sets. In some embodiments, the network device and the terminal device can have a consistent understanding of the sorting manner of the M first bit fields in the first information, to ensure correct transmission of the first information. In addition, in the foregoing method, the terminal device may further discard a bit with a low priority in the first information when resources are limited, to preferentially ensure effective transmission of CSI of an antenna port set with a larger quantity of antenna ports, thereby improving system performance.

In some embodiments, the first information includes M first bit fields. A $K1^{th}$ first bit field in the M first bit fields indicates CSI of a first antenna port set in the M antenna port sets. A $K2^{th}$ first bit field in the M first bit fields indicates CSI of a second antenna port set in the M antenna port sets. K1 and K2 are positive integers less than or equal to M, and K1 is less than K2. Channel quality of the first antenna port set is higher than or equal to channel quality of the second antenna port set.

In some embodiments, the terminal device may discard a bit with a low priority in the first information when resources are limited, to preferentially ensure effective transmission of CSI corresponding to an antenna port set with a high channel quality, thereby improving system performance.

In some embodiments, the first information includes M second bit fields. The M second bit fields respectively indicate indexes of the M antenna port sets.

According to a second aspect, this application provides a CSI measurement method. A network device sends reference signal resource configuration information. The reference signal resource configuration information indicates a first reference signal resource. The first reference signal resource includes P antenna ports. P is a positive integer. The network device receives first information. The first information includes M pieces of CSI that are in a one-to-one correspondence with M antenna port sets. An antenna port in any one of the M antenna port sets is an antenna port in the P antenna ports. M is a positive integer. A quantity of antenna ports in at least one of the M antenna port sets is less than P.

In some embodiments, the network device can obtain CSI corresponding to an antenna port set that includes antenna ports whose quantity is less than a total quantity of antenna ports, and determine a quantity of transmit channels to be used to transmit a signal, to dynamically adjust a quantity of transmit channels, thereby reducing energy consumption of the network device.

In some embodiments, M is an integer greater than or equal to 2. Different antenna port sets include different quantities of antenna ports. Alternatively, different antenna port sets include a same quantity of antenna ports, but include antenna ports that are not completely the same or completely different. In this implementation, the network device can obtain CSI of a plurality of dimensions (that is, a plurality of antenna port sets), and dynamically adjust the quantity of transmit channels provided that an information transmission requirement is met, to improve accuracy that the network device determines whether to enter an energy-saving mode or determines a quantity of transmit channels to be used to transmit a signal.

In some embodiments, the M antenna port sets are protocol-predefined. The antenna port included in any one of the M antenna port sets is the antenna port in the P antenna ports.

In some embodiments, the M antenna port sets are M antenna port sets in N antenna port sets. The N antenna port sets are protocol-predefined. An antenna port in any one of the N antenna port sets is an antenna port in the P antenna ports. N is an integer greater than M.

In some embodiments, the network device sends first indication information. The first indication information indicates N antenna port sets. The M antenna port sets are M antenna port sets in the N antenna port sets. An antenna port in any one of the N antenna port sets is an antenna port in the P antenna ports.

In some embodiments, the network device sends second indication information to the terminal device. The second indication information indicates a CSI measurement mode. The CSI measurement mode includes a mode 1 or a mode 2. The mode 1 is that CSI is measured based on at least a part of the P antenna ports. The mode 2 is that CSI is measured based on all the P antenna ports.

In some embodiments, the network device sends third indication information to the terminal device. The third indication information indicates a first threshold. The first threshold is used to determine the M antenna port sets.

In some embodiments, the network device sends second indication information to the terminal device. The second indication information indicates the M antenna port sets, or the second indication information indicates X antenna ports in the P antenna ports. The antenna port in the M antenna port sets is an antenna port in the X antenna ports, or the antenna port in the M antenna port sets is an antenna port in the P antenna ports except the X antenna ports.

In some embodiments, the second indication information indicates a second resource in the first reference signal resource. The second resource corresponds to the M antenna port sets, or the second resource corresponds to the X antenna ports.

In some embodiments, the second indication information indicates indexes of the X antenna ports in the P antenna ports, or the second indication information indicates indexes of the M antenna port sets.

In some embodiments, the first information includes M first bit fields. A $K1^{th}$ first bit field in the M first bit fields indicates CSI of a first antenna port set in the M antenna port sets. A $K2^{th}$ first bit field in the M first bit fields indicates CSI of a second antenna port set in the M antenna port sets. K1 and K2 are positive integers less than or equal to M, and K1 is less than K2. A quantity of antenna ports included in the first antenna port set is greater than or equal to a quantity of antenna ports included in the second antenna port set.

In some embodiments, when the terminal device discards, due to limited resources, a bit that is sorted behind in the first information, the network device can preferentially obtain CSI of an antenna port set with a large quantity of antenna ports, thereby improving system performance.

In some embodiments, the first information includes M first bit fields. A $K1^{th}$ first bit field in the M first bit fields indicates CSI of a first antenna port set in the M antenna port sets. A $K2^{th}$ first bit field in the M first bit fields indicates CSI of a second antenna port set in the M antenna port sets. K1 and K2 are positive integers less than or equal to M, and K1 is less than K2. Channel quality of the first antenna port set is higher than or equal to channel quality of the second antenna port set.

In some embodiments, when the terminal device discards, due to limited resources, a bit that is sorted behind in the first information, the network device can preferentially obtain CSI of an antenna port set with better channel quality, thereby improving system performance.

In some embodiments, the first information includes M second bit fields. The M second bit fields respectively indicate indexes of the M antenna port sets.

According to a third aspect, this application provides a communication apparatus, configured to implement functions of the terminal in the method provided in the first aspect. The functions may be implemented by hardware, or may be implemented by hardware executing corresponding software. The hardware or the software includes one or more modules corresponding to the foregoing functions.

The communication apparatus includes a receiving unit and a sending unit. The receiving unit is configured to receive reference signal resource configuration information. The reference signal resource configuration information indicates a first reference signal resource. The first reference signal resource includes P antenna ports. P is a positive integer. The sending unit is configured to send first information. The first information includes M pieces of CSI that are in a one-to-one correspondence with M antenna port sets. An antenna port in any one of the M antenna port sets is an antenna port in the P antenna ports. M is a positive integer. A quantity of antenna ports in at least one of the M antenna port sets is less than P.

In some embodiments, the receiving unit is further configured to receive first indication information. The first indication information indicates N antenna port sets. The M antenna port sets are M antenna port sets in the N antenna port sets. An antenna port in any one of the N antenna port sets is an antenna port in the P antenna ports.

In some embodiments, the receiving unit is further configured to receive second indication information. The second indication information indicates a CSI measurement mode. The CSI measurement mode includes a mode 1 or a mode 2.

In some embodiments, the communication apparatus further includes a processing unit. The processing unit is configured to determine the M antenna port sets based on a first threshold. The first threshold is indicated by third indication information. Alternatively, the processing unit is configured to determine the M antenna port sets based on channel quality of the N antenna port sets.

In some embodiments, the receiving unit is further configured to receive second indication information. The second indication information indicates the M antenna port sets, or the second indication information indicates X antenna ports in the P antenna ports. The antenna port in the M antenna port sets is an antenna port in the X antenna ports, or the antenna port in the M antenna port sets is an antenna port in the P antenna ports except the X antenna ports.

According to a fourth aspect, this application provides a communication apparatus, configured to implement functions of the network device in the method provided in the second aspect. The functions may be implemented by hardware, or may be implemented by hardware executing corresponding software. The hardware or the software includes one or more modules corresponding to the foregoing functions.

The communication apparatus includes a sending unit and a receiving unit. The sending unit is configured to send reference signal resource configuration information. The reference signal resource configuration information indicates a first reference signal resource. The first reference signal resource includes P antenna ports. P is a positive integer. The receiving unit is configured to receive first information. The first information includes M pieces of CSI that are in a one-to-one correspondence with M antenna port sets. An antenna port in any one of the M antenna port sets is an antenna port in the P antenna ports. M is a positive integer. A quantity of antenna ports in at least one of the M antenna port sets is less than P.

In some embodiments, the sending unit is further configured to send first indication information. The first indication information indicates N antenna port sets. The M antenna port sets are M antenna port sets in the N antenna port sets.

N is an integer greater than or equal to M. An antenna port in any one of the N antenna port sets is an antenna port in the P antenna ports.

In some embodiments, the sending unit is further configured to send second indication information. The second indication information indicates a CSI measurement mode. The CSI measurement mode includes a mode 1 or a mode 2.

In some embodiments, the sending unit is further configured to send third indication information. The third indication information indicates a first threshold. The first threshold is used to determine the M antenna port sets.

In some embodiments, the sending unit is further configured to send second indication information. The second indication information indicates the M antenna port sets, or the second indication information indicates X antenna ports in the P antenna ports. The antenna port in the M antenna port sets is an antenna port in the X antenna ports, or the antenna port in the M antenna port sets is an antenna port in the P antenna ports except the X antenna ports.

According to a fifth aspect, this application provides a communication apparatus. The communication apparatus may be the terminal device in the method embodiment provided in the first aspect, or a chip used in the terminal device. The communication apparatus includes a processor and an interface circuit. The interface circuit is configured to: receive a signal from another communication apparatus other than the communication apparatus and transmit the signal to the processor, or send a signal from the processor to another communication apparatus other than the communication apparatus. The processor enables, by using a logic circuit or through executing code instructions, the communication apparatus to perform the method performed by the terminal device in the foregoing method embodiments.

According to a sixth aspect, this application provides a communication apparatus. The communication apparatus may be the network device in the method embodiment provided in the second aspect, or may be a chip used in the network device. The communication apparatus includes a processor and an interface circuit. The interface circuit is configured to: receive a signal from another communication apparatus other than the communication apparatus and transmit the signal to the processor, or send a signal from the processor to another communication apparatus other than the communication apparatus. The processor enables, by using a logic circuit or through executing code instructions, the communication apparatus to perform the method performed by the network device in the foregoing method embodiments.

According to a seventh aspect, this application provides a computer-readable storage medium. The computer-readable storage medium stores instructions. When the instructions are executed by a communication apparatus, the method performed by the terminal device in the first aspect is performed, or the method performed by the network device in the second aspect is performed.

According to an eighth aspect, this application provides a computer program product. The computer program product includes a computer program. When the computer program is run, the method performed by the terminal device in the first aspect is performed, or the method performed by the network device in the second aspect is performed.

According to a ninth aspect, this application provides a chip system. The chip system includes a processor, configured to implement functions of the terminal device in the method in the first aspect, or implement functions of the network device in the method in the second aspect. In a possible design, the chip system further includes a memory, configured to store program instructions and/or data. The chip system may include a chip, or may include a chip and another discrete device.

According to a tenth aspect, this application provides a communication system, including at least one communication apparatus in the third aspect or the fifth aspect and at least one communication apparatus in the fourth aspect or the sixth aspect.

DETAILED DESCRIPTION

Figure 1:
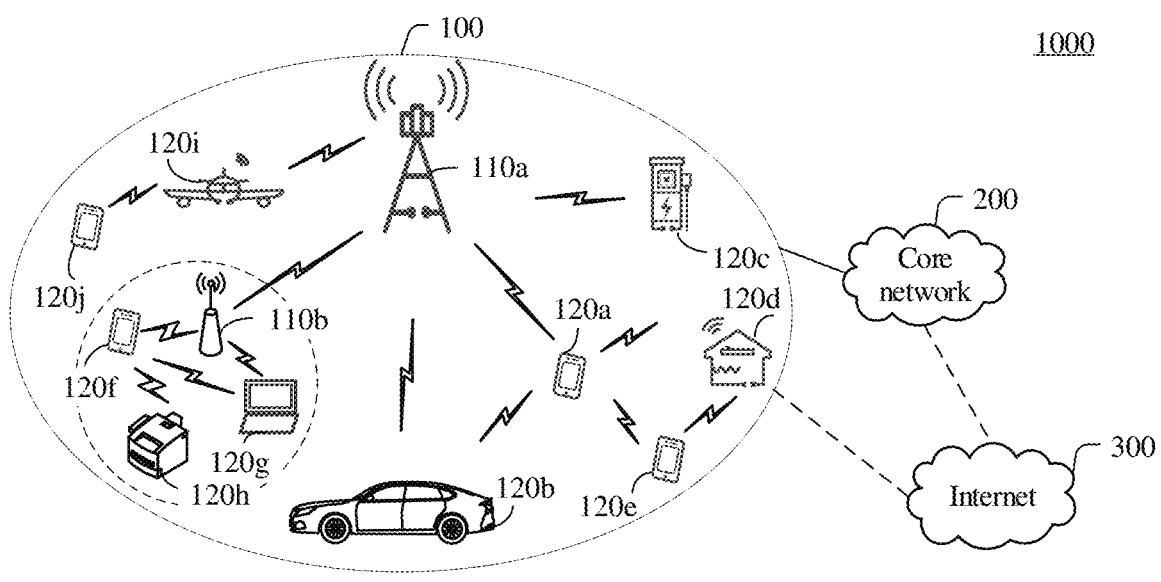
FIG. 1 is a schematic diagram of an architecture of a mobile communication system to which an embodiment of this application is applied.

FIG. 1 is a schematic diagram of an architecture of a communication system 1000 to which an embodiment of this application is applied. As shown in FIG. 1, the communication system includes a radio access network 100 and a core network 200. In some embodiments, the communication system 1000 may further include Internet 300. The radio access network 100 may include at least one radio access network device (for example, 110a and 110b in FIG. 1), and may further include at least one terminal (for example, 120a to 120j in FIG. 1). The terminal is connected to the radio access network device in a wireless manner, and the radio access network device is connected to the core network in a wireless or wired manner. A core network device and the radio access network device may be independent and different physical devices. Alternatively, functions of a core network device and logical functions of the radio access network device are integrated into a same physical device. Alternatively, some functions of a core network device and some functions of the radio access network device are integrated into one physical device. The terminals, and the radio access network devices may be connected to each other in a wired or wireless manner. FIG. 1 is merely a schematic diagram. The communication system may further include other network devices, for example, may further include a wireless relay device and a wireless backhaul device, which are not shown in FIG. 1.

The radio access network device may be a base station (base station), an evolved NodeB (evolved NodeB, eNodeB), a transmission reception point (transmission reception point, TRP), a next generation NodeB (next generation NodeB, gNB) in a fifth generation (5th generation, 5G) mobile communication system, a next generation NodeB in a sixth generation (6th generation, 6G) mobile communication system, a base station in a future mobile communication system, an access node in a Wi-Fi system, or the like. The radio access network device may be alternatively a module or a unit that completes some functions of a base station, for example, may be a central unit (central unit, CU), or may be a distributed unit (distributed unit, DU). The CU herein completes functions of a radio resource control protocol and a packet data convergence protocol (packet data convergence protocol, PDCP) of the base station, and may further complete functions of a service data adaptation protocol (service data adaptation protocol, SDAP). The DU completes functions of a radio link control layer and a medium access control (medium access control, MAC) layer of the base station, and may further complete functions of some or all physical layers. For specific description of the foregoing protocol layers, refer to related technical specifications of the 3rd generation partnership project (3rd generation partnership project, 3GPP). The radio access network device may be a macro base station (for example, 110a in FIG. 1), or may be a micro base station or an indoor base station (for example, 110b in FIG. 1), or may be a relay node or a donor node, or the like. A specific technology and a specific device form that are used by the radio access network device are not limited in embodiments of this application. For ease of description, the following provides description by using an example in which a base station serves as a radio access network device.

The terminal may also be referred to as a terminal device, user equipment (user equipment, UE), a mobile station, a mobile terminal, or the like. The terminal may be widely used in various scenarios such as device-to-device (device-to-device, D2D), vehicle-to-everything (vehicle to everything, V2X) communication, machine-type communication (machine-type communication, MTC), Internet of things (internet of things, IoT), virtual reality, augmented reality, industrial control, self-driving, remote medical, a smart grid, smart furniture, smart office, smart wearables, smart transportation, and a smart city. The terminal may be a mobile phone, a tablet computer, a computer with wireless sending and receiving functions, a wearable device, a vehicle, an unmanned aerial vehicle, a helicopter, an airplane, a ship, a robot, a mechanical arm, a smart home device, or the like. A specific technology and a specific device form that are used by the terminal are not limited in embodiments of this application.

The base station and the terminal may be located in fixed positions, or may be movable. The base station and the terminal device may be deployed on land, including an indoor or outdoor device, a handheld device, or a vehicle-mounted device; or may be deployed on water; or may be deployed on an airplane, a balloon, or an artificial satellite in the air. Application scenarios of the base station and the terminal are not limited in embodiments of this application.

Roles of the base station and the terminal may be relative. For example, a helicopter or an unmanned aerial vehicle 120i in FIG. 1 may be configured as a mobile base station. For a terminal 120j that accesses the radio access network 100 through 120i, the terminal 120i is a base station. However, for a base station 110a, 120i is a terminal. In other words, 110a and 120i communicate with each other according to a wireless air interface protocol. Certainly, 110a and 120i may also communicate with each other according to an interface protocol between base stations. In this case, relative to 110a, 120i is also a base station. Therefore, both the base station and the terminal may be collectively referred to as communication apparatuses. 110a and 110b in FIG. 1 may be referred to as communication apparatuses with functions of a base station. 120a to 120j in FIG. 1 may be referred to as communication apparatuses with functions of a terminal.

Communication between the base station and the terminal, between base stations, and between terminals may be performed over a licensed spectrum, or may be performed over an unlicensed spectrum, or may be performed over both a licensed spectrum and an unlicensed spectrum. Communication may be performed over a spectrum below 6 gigahertz (gigahertz, GHz), or may be performed over a spectrum above 6 GHz, or may be performed over a spectrum below 6 GHz and a spectrum above 6 GHz. A spectrum resource used for wireless communication is not limited in embodiments of this application.

In embodiments of this application, the functions of the base station may be performed by a module (for example, a chip) in the base station, or may be performed by a control subsystem having the functions of the base station. Herein, the control subsystem having the functions of the base station may be a control center in the foregoing application scenarios such as a smart grid, industrial control, smart transportation, and a smart city. The functions of the terminal may be alternatively performed by a module (for example, a chip or a modem) in the terminal, or may be performed by an apparatus having the functions of the terminal.

In embodiments of this application, the base station sends a downlink signal or downlink information to the terminal. The downlink information is carried on a downlink channel. The terminal sends an uplink signal or uplink information to the base station. The uplink information is carried on an uplink channel. To communicate with the base station, the terminal needs to establish a wireless connection to a cell controlled by the base station. A cell with which a wireless connection to the terminal is established is referred to as a serving cell of the terminal. When communicating with the serving cell, the terminal is further interfered by a signal from a neighboring cell.

The following explains and describes some nouns or terms used in embodiments of this application.

(1) Transmit Channel (Transmitter, TX)

A radio frequency (radio frequency, RF) transmit channel is briefly referred to as a transmit channel, and is a physical concept. Unless otherwise specified, the transmit channel in embodiments of this application is a port of a physical antenna instead of a port of a logical antenna. The transmit channel may receive a baseband signal from a baseband subsystem, perform radio frequency processing (such as up-conversion, amplification, and filtering) on the baseband signal to obtain a radio frequency signal, and finally radiate the radio frequency signal into space via an antenna. Specifically, the transmit channel may include one or more electronic components such as an antenna switch, an antenna tuner, a power amplifier (power amplifier, PA), a frequency mixer (mixer), a local oscillator (local oscillator, LO), and a filter (filter). These electronic components may be integrated into one or more chips according to a requirement. The antenna may be alternatively considered as a part of the transmit channel sometimes. In embodiments of this application, terms "physical antenna" and "transmit channel" are interchangeable sometimes.

(2) Antenna Port (Port)

The antenna port may also be briefly referred to as a port. Unless otherwise specified, the antenna port in embodiments of this application is a port of a logical antenna instead of a port of a physical antenna. When one transmit channel is associated with one antenna port, a signal transmitted on each antenna port is transmitted through a transmit channel associated with the antenna port. When a plurality of transmit channels are associated with one antenna port, a signal transmitted on each logical antenna port is weighted by using a weighting coefficient and then transmitted through the plurality of transmit channels. It may also be understood that a plurality of physical antennas are weighted by using a weighting coefficient to form a logical antenna. The weighting coefficient herein may be a complex number or may be a real number. Weighting coefficients on different physical antennas may be the same or may be different. Each antenna port has a corresponding time-frequency resource and a reference signal. Time-frequency resources corresponding to different antenna ports may be the same or may be different. A reference signal transmitted by a base station through an antenna port A may be used by a terminal to estimate a characteristic of a radio channel from the antenna port A to the terminal. The characteristic of the radio channel may be used by the terminal to estimate a physical channel transmitted through the antenna port A, or may be used to determine information such as a modulation order and a bit rate during data transmission. One reference signal may correspond to one or more antenna ports.

(3) CSI

In a process in which a signal passes through a radio channel from a transmit end to a receive end, the signal may go through scattering, reflection, and energy attenuation over distance, and therefore even fading. The CSI represents a characteristic of the radio channel, and may include at least one of the following: a channel quality indicator (channel quality indicator, CQI), a precoding matrix indicator (precoding matrix indicator, PMI), a CSI-RS resource indicator (CSI-RS resource indicator, CRI), a synchronization signal/physical broadcast channel block (synchronization signal/physical broadcast channel block, SSB) resource indicator (SSB resource indicator, SSBRI), a layer indicator (layer indicator, LI), a rank indicator (rank indicator, RI), L1-reference signal received power (reference signal received power, RSRP), and an L1-signal to interference plus noise ratio (signal to interference plus noise ratio, SINR). The CSI may be sent by UE to a base station through a PUCCH or a PUSCH.

(4) Reference Signal

The reference signal is a known signal provided by a transmit end to a receive end for channel estimation or channel sounding. In embodiments of this application, the reference signal may be used for channel measurement, interference measurement, and the like, for example, measurement of parameters such as a reference signal received quality (reference signal received quality, RSRQ), a signal-to-noise ratio (signal-to-noise ratio, SNR), an SINR, a CQI, and a PMI.

(5) Reference Signal Resource

The reference signal resource may specifically include at least one of a time-frequency resource, an antenna port, a power resource, and a scrambling code of a reference signal. A base station may send the reference signal based on the reference signal resource. A terminal may receive the reference signal based on the reference signal resource. In embodiments of this application, one or more antenna ports corresponding to the reference signal resource may be alternatively understood as one or more antenna ports included in the reference signal resource.

Specifically, the reference signal in embodiments of this application may include one or more of the following reference signals: a channel state information reference signal (channel state information-reference signal, CSI-RS), an SSB, or a sounding reference signal (sounding reference signal, SRS). Correspondingly, the reference signal resource may include a CSI-RS resource, an SSB resource, or an SRS resource. In some cases, the SSB may alternatively mean the SSB resource.

Figure 2:
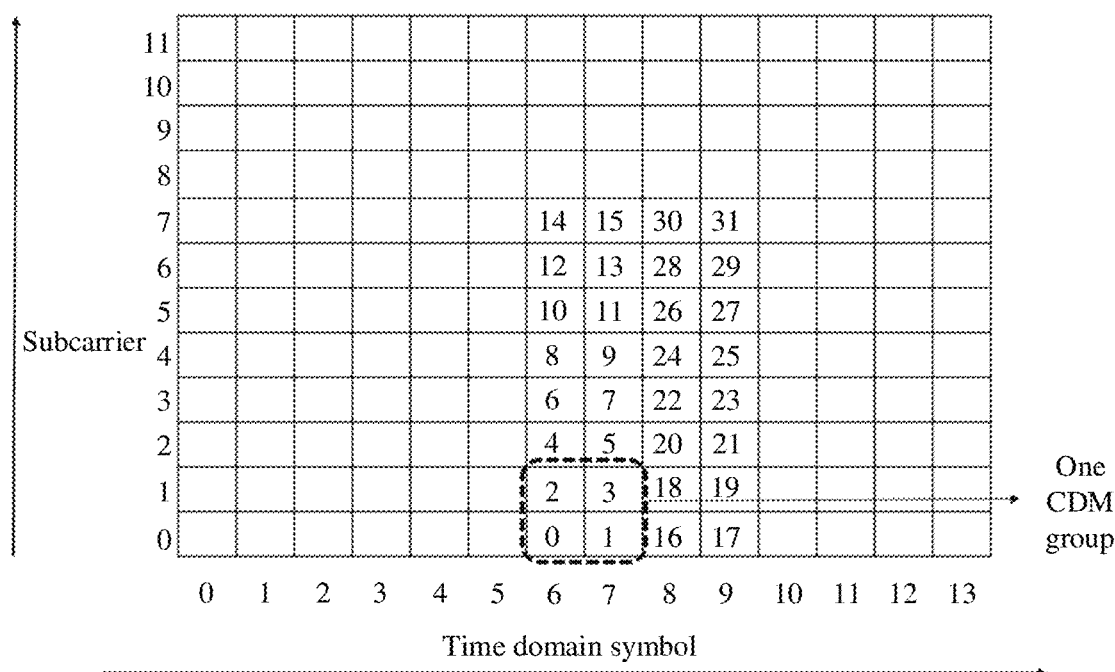
FIG. 2 is a schematic diagram of a relationship between an antenna port and a reference signal resource.

The CSI-RS resource is used as an example. Reference signals on different antenna ports use different time-frequency resources. Alternatively, time-frequency resources of reference signals on different antenna ports are the same but code resources are different. The base station may indicate, by using frequency domain position indication information, a frequency domain resource occupied by the CSI-RS, and may indicate, by using time domain position indication information, a time domain resource occupied by the CSI-RS. The terminal may determine the antenna port by using the time domain resource and the frequency domain resource occupied by the CSI-RS. FIG. 2 is a schematic diagram of a correspondence between an antenna port and a reference signal resource. In the figure, a horizontal axis represents time domain, and a vertical axis represents frequency domain. One resource block (resource block, RB) includes 12 subcarriers and 14 orthogonal frequency division multiplexing (orthogonal frequency division multiplexing, OFDM) symbols. An OFDM symbol may also be briefly referred to as a time domain symbol or a symbol. A code division multiplexing (code division multiplexing, CDM) type of a CSI-RS resource is CDM4-FD2-TD2. A quantity of antenna ports is configured as 32. Frequency domain position indication information is 111100. Time domain position indication information indicates that time domain symbols of a time domain start position occupied by the CSI-RS resource are 6 and 8. In CDM4-FD2-TD2, CDM4 indicates that each CDM group includes four antenna ports, FD2 indicates that each CDM group occupies two subcarriers in frequency domain, and TD2 indicates that each CDM group occupies two time domain symbols in time domain. In this case, the CSI-RS includes eight CDM groups. Each CDM group occupies four resource elements (resource element, RE). Each CDM group includes four antenna ports. In other words, the reference signal resource includes 32 antenna ports, and indexes of the 32 antenna ports are respectively 0 to 31. Antenna ports 0, 1, 2, and 3 belong to a CDM group 1. Antenna ports 4, 5, 6, and 7 belong to a CDM group 2. Antenna ports 8, 9, 10, and 11 belong to a CDM group 3. Antenna ports 12, 13, 14, and 15 belong to a CDM group 4. Antenna ports 16, 17, 18, and 19 belong to a CDM group 5. Antenna ports 20, 21, 22, and 23 belong to a CDM group 6. Antenna ports 24, 25, 26, and 27 belong to a CDM group 7. Antenna ports 28, 29, 30, and 31 belong to a CDM group 8. The base station may indicate, by using 6-bit frequency domain position indication information, subcarriers occupied by the 32 port resources. Each of the 6 bits corresponds to two subcarriers on one RB. In other words, in the 6 bits, a first bit corresponds to subcarriers {0, 1}, a second bit corresponds to subcarriers {2, 3}, a third bit corresponds to subcarriers {4, 5}, a fourth bit corresponds to subcarriers {6, 7}, a fifth bit corresponds to subcarriers {8, 9}, and a sixth bit corresponds to subcarriers {10, 11}. In FIG. 2, when status values of the 6-bit frequency domain position indication information are 111100, the frequency domain resource indication information indicates that positions of a frequency domain resource occupied by the CSI-RS are the subcarrier 0 to the subcarrier 7. Then the base station indicates, by using the time domain position indication information, that the time domain symbols of the time domain start position occupied by the CSI-RS are 6 and 8. Correspondingly, the terminal may determine, by using the received time domain position indication information and frequency domain position indication information, the resources occupied by the CSI-RS, to determine the 32 antenna ports.

(5) Multi-Dimensional CSI Measurement

In some approaches, a terminal measures CSI based on all antenna ports included in a reference signal resource configured by a base station. All the antenna ports included in the reference signal resource may be understood as an antenna port set. The antenna port set is a universal set of the antenna ports included in the reference signal resource. If a quantity of antenna port sets is used as a dimension, CSI measurement of only one dimension is performed in some approaches. In embodiments of this application, multi-dimensional CSI measurement may specifically mean that the terminal may measure CSI based on a plurality of antenna port subsets in the universal set of the antenna ports. The antenna port subset herein includes at least one antenna port, and the antenna port included in the antenna port subset is the antenna port in the universal set of the antenna ports.

(6) Dimension Reduced CSI Measurement

In some approaches, a measurement dimension of CSI is a universal set of an antenna port included in a reference signal resource configured by a base station. In embodiments of this application, dimension reduced CSI measurement may specifically mean that a terminal may measure CSI based on the universal set of the antenna port included in the reference signal resource, or may measure CSI based on at least one proper subset of antenna ports in the universal set of the antenna port. The proper subset of antenna ports in the universal set of the antenna port herein includes at least one antenna port. A quantity of antenna ports included in the proper subset is less than a quantity of antenna ports included in the universal set of the antenna port.

Figure 3:
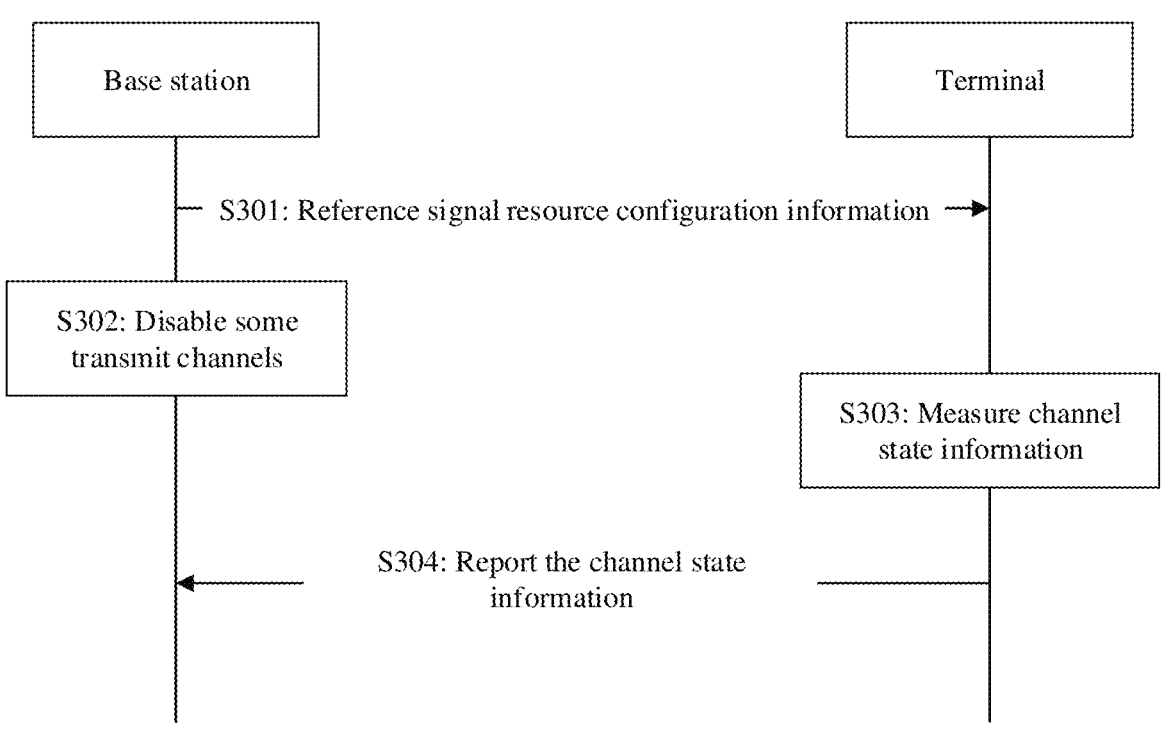
FIG. 3 is a schematic diagram of a CSI measurement method.

Based on the network architecture provided in FIG. 1, the following describes, with reference to FIG. 3, a process in which a terminal and a base station measure CSI in an energy-saving scenario. The base station in the energy-saving scenario may be the radio access network device 110a or 110b in FIG. 1. The terminal may be 120a to 120j in FIG. 1.

S301: The base station sends reference signal resource configuration information to the terminal. Correspondingly, the terminal receives the reference signal resource configuration information from the base station.

Specifically, the base station sends the reference signal resource configuration information to the terminal by using radio resource control (radio resource control, RRC) signaling. The reference signal resource configuration information indicates a reference signal resource. The reference signal resource includes an antenna port used by the terminal to measure CSI. In some approaches, if 32 antenna ports are configured for the base station, the reference signal resource includes 32 antenna ports.

S302: The base station disables S transmit channels, or the base station adds S transmit channels. S is a positive integer.

Specifically, to save energy, the base station dynamically shuts down the S transmit channels; or after the base station disables some transmit channels, the base station dynamically increases the S transmit channels due to an increase in a transmission requirement. In a possible manner, the base station uses different sending policies for a terminal close to the base station and a terminal far away from the base station. The base station transmits information to the terminal close to the base station and the terminal far away from the base station through different quantities of transmit channels. When the base station sends information to the terminal close to the base station, small power is required. Therefore, fewer transmit channels can be used. Correspondingly, when the base station sends information to the terminal far away from the base station, large power is required. Therefore, a large quantity of transmit channels are to be used. For example, for the terminal close to the base station, the base station transmits information through 16 transmit channels; and for the terminal far away from the base station, the base station transmits information through 32 transmit channels. Therefore, for the terminal far away from the base station, as the terminal moves in a direction of approaching the base station, the base station may shut down some transmit channels. Alternatively, for the terminal close to the base station, as the terminal moves in a direction of leaving the base station, the base station may add the transmit channel. In this embodiment of this application, an interval between disabling a transmit channel and increasing a transmit channel may be one or more time units. One time unit may be one OFDM symbol, one slot, one radio frame, or the like.

S303: The terminal obtains CSI through measurement based on the reference signal resource.

Specifically, the terminal performs measurement based on all the antenna ports included in the reference signal resource, to obtain the CSI.

S304: The terminal reports the CSI to the base station.

Specifically, the terminal reports the CSI obtained through measurement to the base station, so that the base station performs resource scheduling based on the CSI.

In step S302, because the quantity of transmit channels changes, an antenna port used by the base station to send a reference signal changes accordingly. In other words, the antenna port used by the base station to send the reference signal is inconsistent with the antenna port included in the previously configured reference signal resource. If the terminal still receives the reference signal based on the previously configured antenna port, the CSI determined by the terminal is inaccurate. For example, one transmit channel is associated with one antenna port. The reference signal resource includes 32 antenna ports, there are also 32 transmit channels of the base station. If the transmit channel disabled by the base station in step S302 is 16 antenna ports of the 32 antenna ports, the base station sends the reference signal through 16 antenna ports. The terminal measures the CSI based on the 32 antenna ports included in the reference signal resource. The CSI determined by the terminal cannot accurately reflect a real channel status, thereby affecting communication quality and efficiency.

This application provides the CSI measurement method. The terminal may measure the CSI based on the at least one proper subset of antenna ports in the universal set of the antenna port included in the reference signal resource. Alternatively, the terminal may measure the CSI based on the universal set of the antenna port and the at least one proper subset of antenna ports in the universal set. In this way, the CSI of different dimensions is obtained, to implement multi-dimensional CSI measurement or dimension reduced CSI measurement. The network device can dynamically adjust the quantity of transmit channels based on different dimensions of channel state information reported by the terminal device, thereby reducing energy consumption of the network device.

Figure 4:
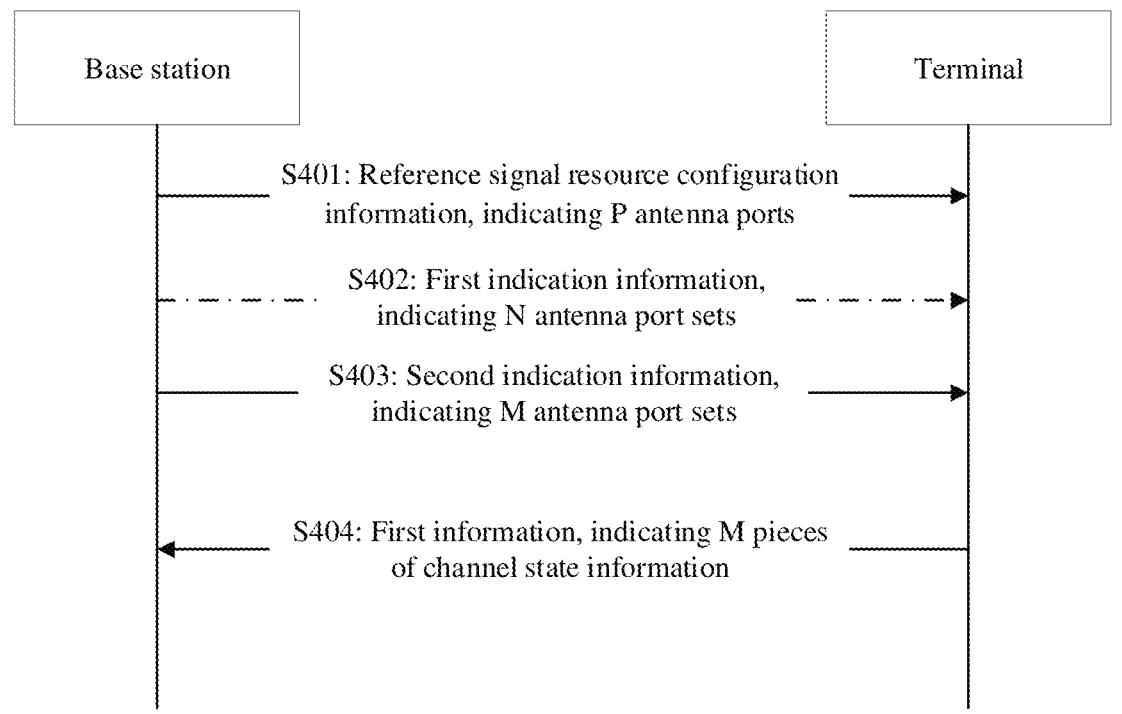
FIG. 4 is a schematic flowchart of a CSI measurement method according to an embodiment of this application.

FIG. 4 is a schematic flowchart of a CSI measurement method according to this application. The following describes operations shown in FIG. 4.

S401: A base station sends reference signal resource configuration information to a terminal, and correspondingly, the terminal receives the reference signal resource configuration information from the base station.

Specifically, the reference signal resource configuration information indicates a first reference signal resource. The first reference signal resource includes P antenna ports. P is a positive integer. The reference signal resource configuration information includes information about a transmission resource required for CSI measurement. The CSI measurement may include channel measurement. In some embodiments, the reference signal resource configuration information includes information such as frequency domain resource configuration, time domain resource configuration, code group configuration, and antenna port configuration.

In a possible implementation, the first reference signal resource may be a CSI-RS resource or an SSB resource. The CSI-RS resource may be a non-zero power (non-zero-power, NZP) CSI-RS resource.

In a possible implementation, the first reference signal resource is a channel measurement resource (channel measurement resource, CMR).

S402: The base station sends first indication information to the terminal, and correspondingly, the terminal receives the first indication information from the base station.

The first indication information indicates N antenna port sets. N is a positive integer. An antenna port included in any one of the N antenna port sets is an antenna port in the P antenna ports. A quantity of antenna ports included in at least one of the N antenna port sets is less than P. The first indication information may be carried in RRC signaling. The first indication information and the reference signal resource configuration information in step S401 may be carried in same RRC signaling.

Specifically, the base station may select P(i) antenna ports from the P antenna ports to form an antenna port set i, where i is a natural number less than N, and P(i) is a positive integer less than or equal to P. In the N antenna port sets, different antenna port sets include different quantities of antenna ports; or different antenna port sets include a same quantity of antenna ports, but include different antenna ports; or different antenna port sets include different quantities of antenna ports, and the included antenna ports are different antenna ports. To distinguish between different antenna ports, numbers of the P antenna ports are respectively 0 to (P−1). The numbers may also be understood as indexes of different antenna ports. To distinguish between different antenna port sets, numbers of the N antenna port sets are respectively 0 to (N−1). The numbers may also be understood as indexes of different antenna port sets. It may be understood that numbers or indexes in this embodiment of this application may be numbered from 0 or may be numbered from 1.

Figure 5:
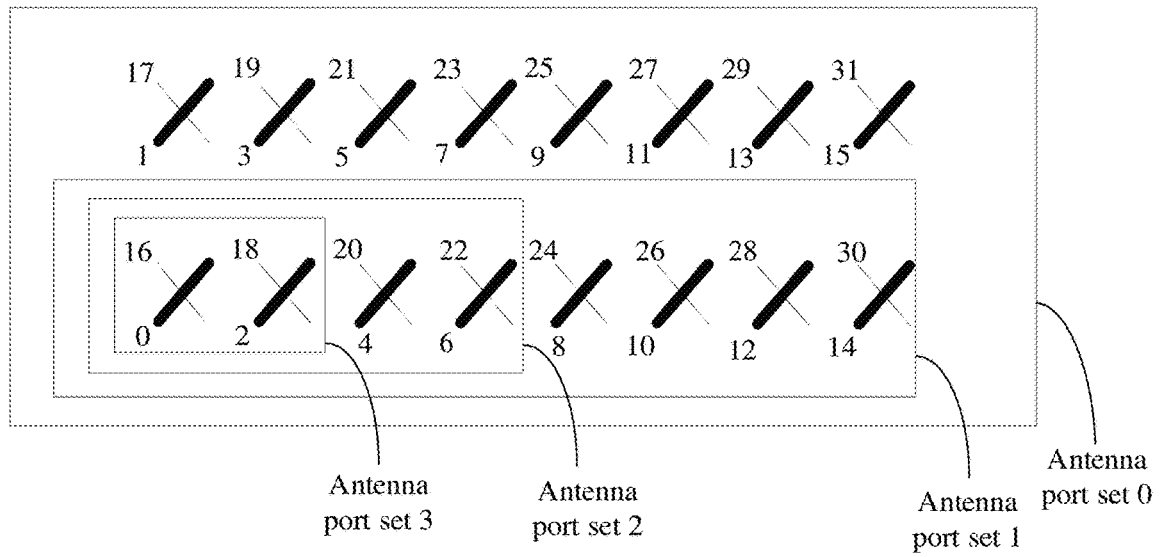
FIG. 5 is a schematic diagram of a correspondence between an antenna port set and an antenna port according to an embodiment of this application.

FIG. 5 shows an example of N antenna port sets according to an embodiment of this application. In FIG. 5, P is 32, N is 4, and an antenna port set whose index is 0 includes 32 antenna ports. In other words, the antenna port set whose index is 0 includes all antenna ports corresponding to the first reference signal resource. An antenna port set whose index is 1 includes 16 antenna ports, and the 16 antenna ports respectively correspond to 16 antenna ports whose indexes are even numbers. The antenna port set whose index is 1 may also be represented as {0, 2, 4, 6, 8, 10, 12, 14, 16, 18, 20, 22, 24, 26, 28, 30}. An antenna port set whose index is 2 includes eight antenna ports, and the eight antenna ports respectively correspond to antenna ports whose indexes are 0, 2, 4, 6, 16, 18, 20, and 22. An antenna port set whose index is 3 includes four antenna ports, and the four antenna ports respectively correspond to antenna ports whose indexes are 0, 2, 16, and 18.

It should be understood that a value of N and a relationship between a party of the P antenna ports and the other party of the N antenna port sets are not limited in this application. For example, the value of N may be another value such as 6, 8, or 10.

In a possible implementation, the N antenna port sets may also be protocol-predefined. In this case, without signaling exchange, the base station and the terminal can learn of in advance an antenna port included in each of the N antenna port sets. In other words, step S402 is optional.

S403: The base station sends second indication information to the terminal, and correspondingly, the terminal receives the second indication information from the base station.

The second indication information indicates the M antenna port sets, and the M antenna port sets are antenna port sets in the N antenna port sets. It may also be understood that the N antenna port sets include the M antenna port sets. Alternatively, the second indication information indicates X antenna ports in the P antenna ports, where an antenna port in the M antenna port sets is an antenna port in the X antenna ports, or an antenna port in the M antenna port sets is an antenna port in the P antenna ports except the X antenna ports. M is a positive integer less than or equal to N.

When the second indication information indicates the X antenna ports in the P antenna ports, the second indication information indicates a universal set of the antenna port in the M antenna port sets. In this case, it may also be understood that the second indication information indirectly indicates the M antenna port sets by indicating the universal set of the antenna port in the M antenna port sets. Alternatively, the second indication information indicates a complementary set of the antenna port in the M antenna port sets in the P antenna ports, and the second indication information indirectly indicates the M antenna port sets by indicating an antenna port that is in the P antenna ports and that does not belong to the M antenna port sets.

An example in which the X antenna ports indicated by the second indication information is the universal set of the antenna port in the M antenna port sets is used. In a possible implementation, M is greater than or equal to 2. The antenna port in any one of the M antenna port sets is an antenna port in the X antenna ports. In another possible implementation, M is 1, and all the X antenna ports form one antenna port set.

The following provides several possible implementations in which the second indication information indicates the M antenna port sets.

Manner 1: The second indication information indicates indexes of the M antenna port sets.

For example, if the indexes indicated by the second indication information are 0 and 1, the antenna port sets indicated by the second indication information are an antenna port set whose index is 0 and an antenna port set whose index is 1. When the N antenna port sets are shown in FIG. 5, the two antenna port sets indicated by the second indication information are {0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31} and {0, 2, 4, 6, 8, 10, 12, 14, 16, 18, 20, 22, 24, 26, 28, 30}.

Manner 2: The second indication information indicates the M antenna port sets by using a bitmap.

For example, the second indication information includes N bits, and the N bits are in a one-to-one correspondence with the N antenna port sets. A different status value of each bit in the N bits indicates whether an antenna port set corresponding to the bit belongs to or does not belong to the M antenna port sets. For example, a bit value 0 indicates that an antenna port set corresponding to the bit does not belong to the M antenna port sets, and a bit value 1 indicates that an antenna port set corresponding to the bit belongs to the M antenna port sets; or a bit value 1 indicates that an antenna port set corresponding to the bit does not belong to the M antenna port sets, and a bit value 0 indicates that an antenna port set corresponding to the bit belongs to the M antenna port sets.

Manner 3: The second indication information indicates a second resource in the first reference signal resource, and the second resource corresponds to the M antenna port sets. In other words, the second indication information indicates the second resource corresponding to the M antenna port sets, to notify the terminal of an antenna port set for which CSI needs to be measured.

The following provides several possible implementations in which the second indication information indicates the X antenna ports in the P antenna ports.

Manner A: The second indication information indicates indexes of the X antenna ports, and the X antenna ports belong to the M antenna port sets. It may also be understood that the antenna port in the M antenna port sets is an antenna port in the X antenna ports. FIG. 5 is used as an example. When the second indication information indicates 0, 2, 16, and 18, the M antenna port sets include an antenna port set including antenna ports whose indexes are 0, 2, 16, and 18. In other words, the second indication information indicates an antenna port set 3. When the second indication information indicates 0, 2, 16, 18, 4, 6, 20, and 22, the second indication information indicates two antenna port sets: respectively, an antenna port set 3 and an antenna port set 2. Alternatively, the second indication information indicates indexes of the X antenna ports, and the X antenna ports do not belong to the M antenna port sets. It may also be understood that the antenna port in the M antenna port sets is an antenna port in the P antenna ports except the X antenna ports. A division manner of the antenna port sets shown in FIG. 5 is described in detail. When the second indication information indicates 8, 10, 24, and 26, the M antenna port sets are one or more antenna port sets that do not include antenna ports whose indexes are 8, 10, 24, and 26. In this case, the M antenna port sets are an antenna port set {0, 2, 16, 18} and an antenna port set {0, 2, 16, 18, 4, 6, 20, 22}, that is, an antenna port set 3 and an antenna port set 2.

Manner B: The second indication information indicates the X antenna ports by using a bitmap, the second indication information includes P bits, and the P bits are in a one-to-one correspondence with the P antenna ports. A different status value of each bit in the P bits indicates whether an antenna port corresponding to the bit belongs to or does not belong to the M antenna port sets. For example, a bit value 0 indicates that an antenna port corresponding to the bit does not belong to the M antenna port sets, and a bit value 1 indicates that an antenna port corresponding to the bit belongs to the M antenna port sets; or a bit value 1 indicates that an antenna port corresponding to the bit does not belong to the M antenna port sets, and a bit value 0 indicates that an antenna port corresponding to the bit belongs to the M antenna port sets.

Figure 6:
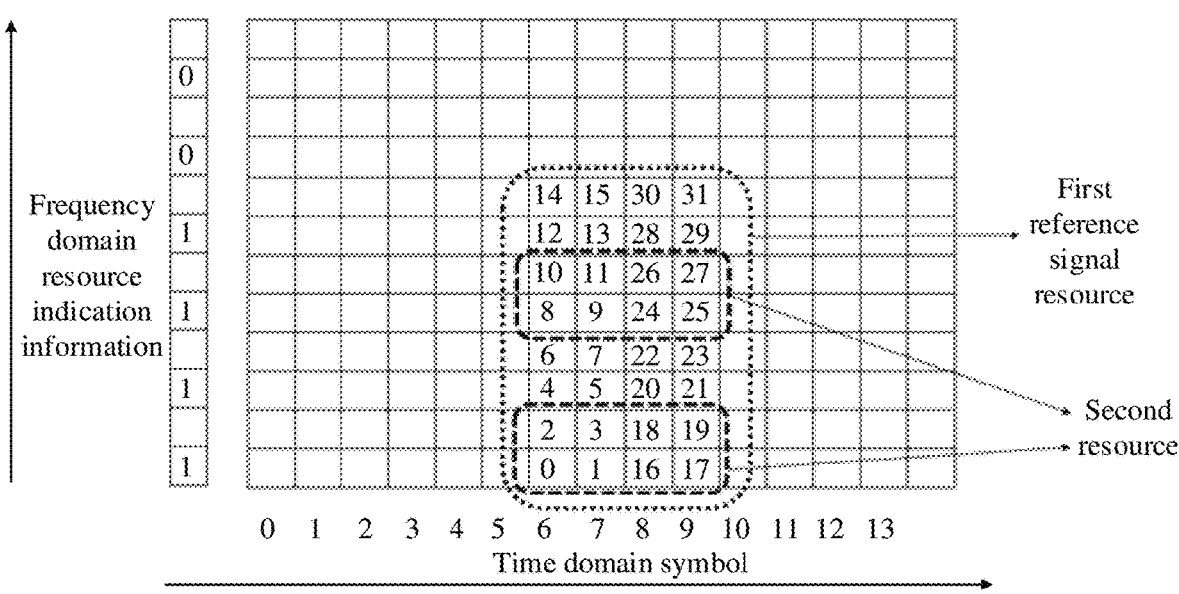
FIG. 6 is a schematic diagram in which second indication information indicates a second resource.
Figure 7:
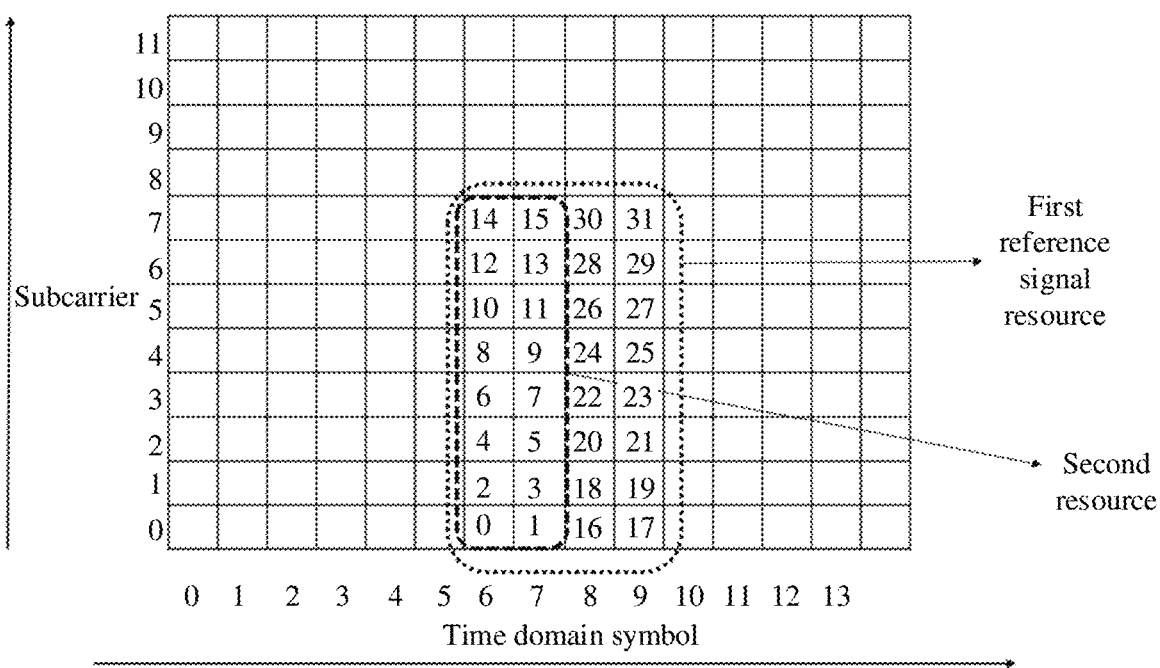
FIG. 7 is another schematic diagram in which second indication information indicates a second resource.
Figure 8:
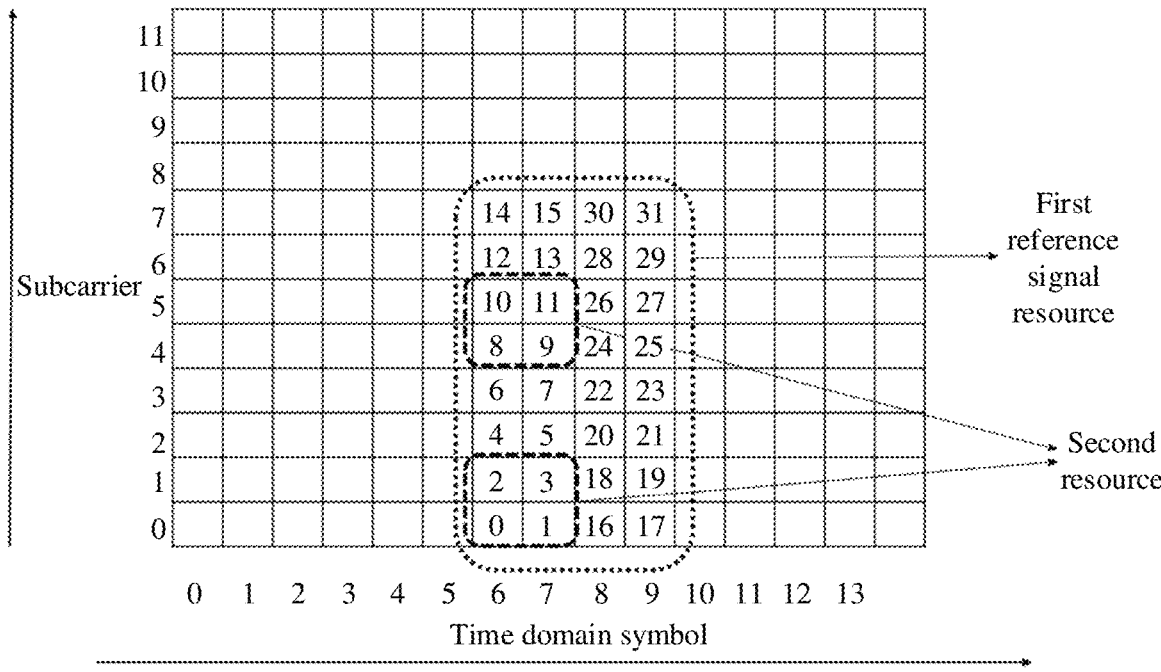
FIG. 8 is still another schematic diagram in which second indication information indicates a second resource.

Manner C: The second indication information indicates a second resource in the first reference signal resource, and the second resource corresponds to the X antenna ports. The second indication information indicates the second resource corresponding to the X antenna ports, to notify the terminal of an antenna port for which CSI needs to be measured or an antenna port for which CSI does not need to be measured. An example in which the X antenna ports belong to the M antenna port sets is used for detailed description. For example, the second indication information indicates the second resource by using a bitmap. The second indication information includes a plurality of bits. Each of the plurality of bits corresponds to one time-frequency resource. Each time-frequency resource corresponds to one or more antenna ports. A different status value of each bit of the plurality of bits indicates whether one or more antenna ports corresponding to the time-frequency resource corresponding to the bit belong to or do not belong to the X antenna ports. For example, a bit value 0 indicates that one or more antenna ports corresponding to the time-frequency resource corresponding to the bit are not antenna ports in the X antenna ports. A bit value 1 indicates that one or more antenna ports corresponding to the time-frequency resource corresponding to the bit are antenna ports in the X antenna ports. For example, in the correspondence between a reference signal resource and an antenna port shown in FIG. 2, the second indication information includes 8 bits respectively corresponding to time-frequency resources corresponding to eight CDM groups. For ease of description, the eight CDM groups are respectively numbered 0 to 8. When status values of the 8 bits are 11001100, the second resource indicated by the second indication information is a resource in which a CDM group 0, a CDM group 1, a CDM group 4, and a CDM group 5 are located in the first reference signal resource. In this case, the X antenna ports are 16 antenna ports included in the CDM group 0, the CDM group 1, the CDM group 4, and the CDM group 5. For another example, the second indication information indicates a time domain position and/or a frequency domain position of the second resource, and antenna ports included in the first reference signal resource in the time domain position and/or the frequency domain position are the X antenna ports. Detailed description is provided with reference to FIG. 6, FIG. 7, and FIG. 8. In FIG. 6, FIG. 7, and FIG. 8, a CDM type of the first reference signal resource is CDM4-FD2-TD2, a quantity of antenna ports is configured as 32, frequency domain position indication information is 111100, and time domain position indication information indicates that a time domain start position occupied by the first reference signal resource is a symbol 6 and a symbol 8.

In a possible implementation, the second indication information indicates a frequency domain position of the second resource, and a time domain resource of the second resource is the same as that of the first reference signal resource. Specifically, the second indication information indicates the frequency domain position in the second resource by using a first bitmap. In FIG. 6, a first bit of the first bitmap corresponds to subcarriers {0, 1} in the first reference signal resource, a second bit of the first bitmap corresponds to subcarriers {2, 3}, a third bit of the first bitmap corresponds to subcarriers {4, 5}, and a fourth bit of the first bitmap corresponds to subcarriers {6, 7}. In the first bitmap, each bit corresponds to two subcarriers. A value 1 indicates that the second resource occupies two corresponding subcarriers, and a value 0 indicates that the second resource does not occupy two corresponding subcarriers. Therefore, a value 1010 of the first bitmap indicates that subcarriers occupied by the second resource are the subcarriers 0, 1, 4, and 5 in the first reference signal resource. In addition, a resource corresponding to the second resource is shown in FIG. 6, and the second resource may be used to measure CSI corresponding to an antenna port set including 16 antenna ports.

In a possible implementation, the second indication information indicates a time domain position of the second resource, and a frequency domain resource of the second resource is the same as that of the first reference signal resource. Specifically, the second indication information indicates the time domain position in the second resource by using a second bitmap. In FIG. 7, a first bit of the bitmap corresponds to a first symbol group in the first reference signal resource, that is, a symbol 6 and a symbol 7. A second bit of the bitmap corresponds to a second symbol group in the first reference signal resource, that is, a symbol 8 and a symbol 9. In the second bitmap, each bit corresponds to one symbol group, and a value 1 indicates that the second resource occupies a corresponding symbol group, and a value 0 indicates that the second resource does not occupy a corresponding symbol group. A bitmap 10 indicates that a symbol group occupied by the second resource is the symbol 6 and the symbol 7 in the first reference signal resource. A resource corresponding to the second resource is shown in FIG. 7. The second resource may be used to measure CSI corresponding to an antenna port set including 16 antenna ports.

In a possible implementation, the second indication information indicates a frequency domain position and a time domain position of the second resource. The second indication information may indicate the frequency domain position and the time domain position of the second resource by respectively using the first bitmap and the second bitmap. For example, the value of the first bitmap is 1010, and the value of the second bitmap is 10. A resource corresponding to the second resource is shown in FIG. 8. The second resource may be used to measure CSI corresponding to an antenna port set including eight antenna ports.

It should be noted that in this embodiment of this application, the M antenna port sets may be indicated by the base station to the terminal by using signaling, or may be independently determined by the terminal. For example, a value of M may be fixed to N, or a relationship between M and N is protocol-predefined. When M is equal to N, and N is protocol-predefined, it may also be understood that M is predefined by the protocol, and the M antenna port sets are predefined by the protocol. In other words, step S403 is optional.

S404: The terminal sends first information to the base station, where the first information includes M pieces of CSI that are in a one-to-one correspondence with the M antenna port sets; and correspondingly, the base station receives the first information sent by the terminal.

Because quantities of antenna ports included in the M antenna port sets are different, or antenna ports included in the M antenna port sets are not completely the same or completely different, CSI corresponding to different antenna port sets in the M antenna port sets is different.

In some embodiments, the first information includes M first bit fields, and the M first bit fields respectively indicate CSI corresponding to the M antenna port sets.

Table 1 shows an example of the M first bit fields in the first information. The first information includes one bit sequence. The bit sequence may be divided into M segments of first bit fields, respectively $a_0$, $a_1$, $a_2$, $a_3$, $a_4$, . . . , and $a_{(M-1)}$. The M antenna port sets are respectively $O_0$, $O_1$, $O_2$, $O_3$, $O_4$, . . . , and $O_{(M-1)}$. Herein, $a_i$ indicates CSI of $O_i$, and i is a natural number less than M.

TABLE 1

| $a_0$ | $a_1$ | $a_2$ | $a_3$ | $a_4$ | . . . | $a_{(M-1)}$ |
|-------|-------|-------|-------|-------|-------|-------------|
| $O_0$ | $O_1$ | $O_2$ | $O_3$ | $O_4$ | . . . | $O_{(M-1)}$ |

The following provides several possible implementations of sorting the M first bit fields in a bit stream of the first information.

Manner a: An order of the M first bit fields in the bit stream of the first information is based on quantities of antenna ports iN antenna port sets corresponding to the bit fields.

If a bit in a front position in the bit stream of the first information has a higher priority, and preferentially obtains a transmission opportunity when transmission resources are limited, for an antenna port set that includes a larger quantity of antenna ports, a first bit field corresponding to the antenna port set is in a more front position in the bit stream of the first information. In other words, a sequence number of the first bit field corresponding to the antenna port set in the bit stream of the first information is smaller. For example, a $K1^{th}$ first bit field in the M first bit fields indicates CSI of a first antenna port set in the M antenna port sets, and a $K2^{th}$ first bit field in the M first bit fields indicates CSI of a second antenna port set in the M antenna port sets. K1 and K2 are positive integers less than or equal to M, and K1 is less than K2. A quantity of antenna ports in the first antenna port set is greater than or equal to a quantity of antenna ports in the second antenna port set.

If a bit in a back position in the bit stream of the first information has a higher priority, and preferentially obtains a transmission opportunity when transmission resources are limited, for an antenna port set that includes a larger quantity antenna ports, a first bit field corresponding to the antenna port set is in a more back position in the bit stream of the first information. In other words, a sequence number of the first bit field corresponding to the antenna port set in the bit stream of the first information is larger. For example, a $K1^{th}$ first bit field in the M first bit fields indicates CSI of a first antenna port set in the M antenna port sets, and a $K2^{th}$ first bit field in the M first bit fields indicates CSI of a second antenna port set in the M antenna port sets. K1 and K2 are positive integers less than or equal to M, and K1 is less than K2. A quantity of antenna ports in the second antenna port set is greater than or equal to a quantity of antenna ports in the first antenna port set.

In Manner a, the base station and the terminal can have a consistent understanding of the sorting manner of the M first bit fields in the first information, to ensure correct transmission of the first information. In addition, in the foregoing method, the terminal may further discard a bit with a low priority in the first information when resources are limited, to preferentially ensure effective transmission of CSI of an antenna port set with a larger quantity of antenna ports, thereby improving system performance.

Manner b: An order of the M first bit fields in the bit stream of the first information is based on channel quality of antenna port sets corresponding to the bit fields.

If a bit (that is, a high-order bit) in a front position in the bit stream of the first information has a higher priority, and preferentially obtains a transmission opportunity when transmission resources are limited, for an antenna port set with better channel quality, a first bit field corresponding to the antenna port set is in a more front position in the bit stream of the first information. In other words, a sequence number of the first bit field corresponding to the antenna port set in the bit stream of the first information is smaller. For example, a $K1^{th}$ first bit field in the M first bit fields indicates CSI of a first antenna port set in the M antenna port sets, and a $K2^{th}$ first bit field in the M first bit fields indicates CSI of a second antenna port set in the M antenna port sets. K1 and K2 are positive integers less than or equal to M, and K1 is less than K2. Channel quality of the first antenna port set is higher than or equal to channel quality of the second antenna port set.

If a bit (that is, a low-order bit) in a back position in the bit stream of the first information has a higher priority, and preferentially obtains a transmission opportunity when transmission resources are limited, for an antenna port set with better channel quality, a first bit field corresponding to the antenna port set is in a more back position in the bit stream of the first information. In other words, a sequence number of the first bit field corresponding to the antenna port set in the bit stream of the first information is larger. For example, a $K1^{th}$ first bit field in the M first bit fields indicates CSI of a first antenna port set in the M antenna port sets, and a $K2^{th}$ first bit field in the M first bit fields indicates CSI of a second antenna port set in the M antenna port sets. K1 and K2 are positive integers less than or equal to M, and K1 is less than K2. Channel quality of the second antenna port set is higher than or equal to channel quality of the first antenna port set.

In Manner b, when resources are limited, the terminal may discard a bit with a low priority in the first information, to preferentially ensure effective transmission of CSI of an antenna port set with better channel quality, thereby improving system performance.

In this embodiment of this application, channel quality of an antenna port set may also be referred to as channel quality corresponding to an antenna port set, and indicates channel quality obtained by measuring each port in the port set by the terminal.

In Manner a or Manner b, because the terminal discards a high-order bit or a low-order bit in the first information, it may also be understood that priorities of the M antenna port sets are different. For example, when a position of a first bit field that corresponds to an antenna port set with a large quantity of antenna ports is lower, and a high-order bit in the first information is discarded when resources of the terminal are limited, in the M antenna port sets, an antenna port set that includes a larger quantity of antenna ports has a higher priority. For another example, when a position of a first bit field that corresponds to an antenna port set with better channel quality is lower, and a high-order bit in the first information is discarded when resources of the terminal are limited, in the M antenna port sets, an antenna port set with better channel quality has a higher priority.

When a priority order of the M antenna port sets is that an antenna port set with better channel quality in CSI has a higher priority, because the base station cannot learn in advance of an antenna port set corresponding to CSI indicated by each first bit field, in a possible implementation, the terminal may further report indexes of the M antenna port sets in the first information. For example, the first information further includes M second bit fields. The M second bit fields respectively indicate the indexes of the M antenna port sets. The M second bit fields are in a one-to-one correspondence with the M first bit fields.

Table 2 shows an example in which when M is equal to 4, the first information includes four pieces of CSI that are in a one-to-one correspondence with four antenna port sets. A "CSI report" includes the first information of the M pieces of CSI. In Table 2, the first information includes four first bit fields that respectively correspond to CSI of the four antenna port sets, and the four pieces of CSI are sorted in descending order of quantities of antenna ports included in the antenna port sets. It may also be understood that CSI of an antenna port set that includes a larger quantity of antenna ports has a higher priority.

TABLE 2

| CSI report | CSI of an antenna port set $I_0$ (32 ports) |
| | CSI of an antenna port set $I_1$ (16 ports) |
| | CSI of an antenna port set $I_2$ (eight ports) |
| | CSI of an antenna port set $I_3$ (four ports) |

In FIG. 4, the base station directly or indirectly indicates the M antenna port sets to the terminal by using the second indication information, or the M antenna port sets are protocol-predefined. The following describes a case in which the base station does not directly or indirectly indicate the M antenna port sets by using signaling, but the terminal independently determines the M antenna port sets.

Figure 9:
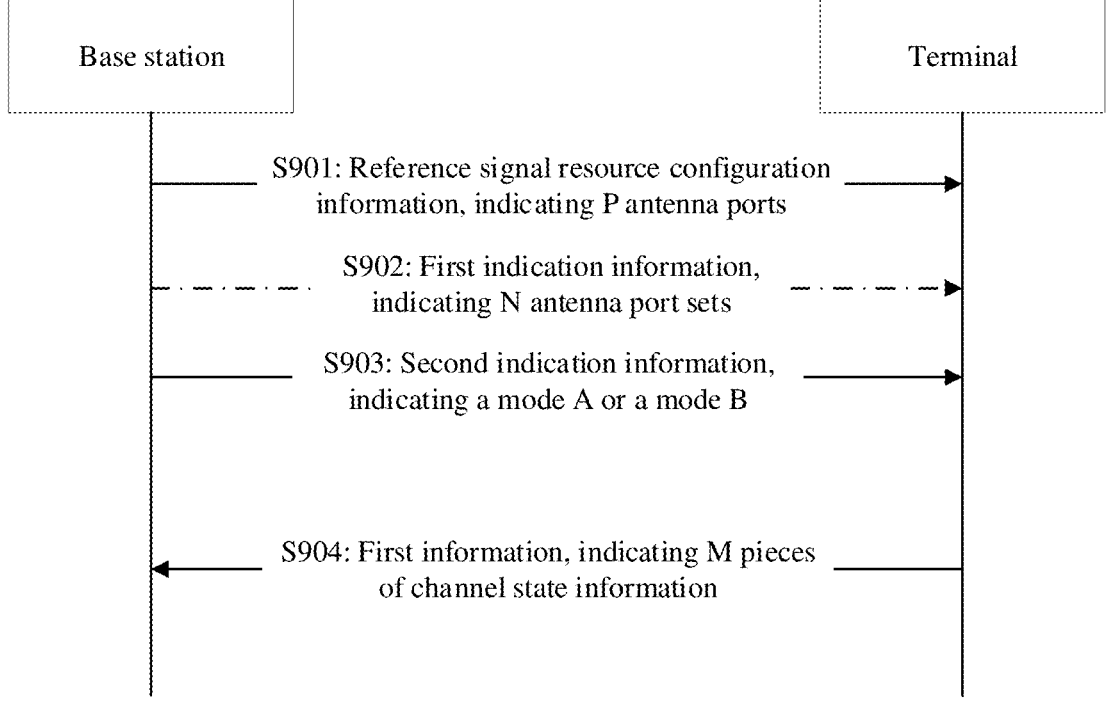
FIG. 9 is a schematic flowchart of another CSI measurement method according to an embodiment of this application.

FIG. 9 is a schematic flowchart of a CSI measurement method according to this application. In FIG. 9, a base station triggers, by using second indication information (mode indication information), a terminal to enter different modes, to implement multi-dimensional CSI measurement or dimension reduced CSI measurement. The following describes operations shown in FIG. 9.

S901: The base station sends reference signal resource configuration information to the terminal, and correspondingly, the terminal receives the reference signal resource configuration information from the base station.

Specifically, for detailed description of the reference signal resource configuration information, refer to the related description of step S401 in FIG. 4.

S902: The base station sends first indication information to the terminal, and correspondingly, the terminal receives the first indication information from the base station.

The first indication information indicates N antenna port sets. For detailed description of the first indication information and the N antenna port sets, refer to the related description of step S402 in FIG. 4.

S903: The base station sends second indication information to the terminal, and correspondingly, the terminal receives the second indication information from the base station.

Specifically, the second indication information indicates a CSI measurement mode. The CSI measurement mode includes a mode 1 and/or a mode 2. In some embodiments, the second indication information may be carried in RRC signaling, a medium access control control element (medium access control control element, MAC CE) MAC CE, or DCI.

In the mode 1, the terminal measures CSI based on at least a part of P antenna ports. It is also understood that the terminal may measure the CSI based on a part of the P antenna ports, or may measure the CSI based on a part of the P antenna ports and all the antenna ports. The mode 1 may also be referred to as an energy-saving mode, a dimension reduced CSI measurement mode, or a multi-dimensional CSI measurement mode.

The mode 2 is that the terminal can measure CSI only based on all P antenna ports. The mode 2 may also be referred to as a normal mode, a mode obtained after dimension reduced CSI measurement is deactivated, a mode obtained after multi-dimensional CSI measurement is deactivated, or a non-dimension reduced CSI measurement mode or a non-multi-dimensional CSI measurement mode. The deactivation herein may also be understood as disabling. In other words, the second indication information is a functional enabling/disabling indication. To determine whether the base station can enter the energy-saving mode (that is, whether the base station can disable S transmit channels), the base station may send the second indication information to the terminal to indicate that the CSI measurement mode of the terminal is the mode 1, so that the terminal feeds back the CSI based on a part of the P antenna ports, or the terminal feeds back the CSI based on a part of the P antenna ports and the CSI based on all the P antenna ports. After the base station enables the disabled S transmit channels, the base station enters a normal working mode. The base station may send the second indication information to the terminal to indicate that the CSI measurement mode of the terminal is the mode 2. Subsequently, the terminal feeds back only the CSI based on all the P antenna ports.

For the terminal, if the terminal does not receive the second indication information indicating the mode 1, the terminal measures the CSI based on all the antenna ports (that is, the P antenna ports) included in a reference signal resource. After the terminal receives the second indication information indicating the mode 1, the terminal determines that the CSI may be measured based on the P antenna ports, or the CSI may be measured based on a part of the P antenna ports. In this case, it may also be understood that the terminal enables dimension reduced CSI measurement, multi-dimensional CSI measurement, or CSI measurement in the energy-saving mode. For example, P is 32. After the terminal receives the second indication information indicating the mode 1, the terminal may measure the CSI based on the 32 antenna ports, or may measure the CSI based on a part of the 32 antenna ports. When at least two antenna port sets are used by the terminal to measure the CSI, and a quantity of antenna ports in at least one of the at least two antenna port sets is less than P, it may be considered that the second indication information indicates dimension reduced CSI measurement, or indicates multi-dimensional CSI measurement, or indicates the energy-saving mode.

For the terminal, if the terminal receives the second indication information indicating the mode 1, the terminal enables dimension reduced CSI measurement, multi-dimensional CSI measurement, or CSI measurement in the energy-saving mode. If the second indication information indicating the mode 2 is not received, the terminal keeps dimension reduced CSI measurement, multi-dimensional CSI measurement, or CSI measurement in the energy-saving mode. After the terminal receives the second indication information indicating the mode 2, the terminal disables dimension reduced CSI measurement, multi-dimensional CSI measurement, or CSI measurement in the energy-saving mode. The terminal measures the CSI based on the P antenna ports.

In some embodiments, after the terminal receives the second indication information, within a time threshold, the terminal determines that the CSI may be measured based on a part of the P antenna ports. Outside the time threshold, the terminal measures the CSI only based on the P antenna ports. In other words, in this case, the second indication information does not need to indicate the mode 2. After the terminal receives the second indication information indicating the mode 1, the terminal automatically enters the mode 2 outside the time threshold.

There are two optional implementations below for the second indication information.

In some embodiments, the second indication information indicates the mode 1 or the mode 2 by using a different status value of a same indication field. For example, the second indication information includes a 1-bit indication field, and the 1-bit indication field corresponds to a status value 1 and a status value 0. The status value 1 indicates the mode 1, and the status value 0 indicates the mode 2. In another optional implementation, through indicating a shutdown level, the base station indicates that the CSI measurement mode is the mode 1 or the mode 2. The shutdown level may correspond to a quantity of S disabled transmit channels, or may correspond to a quantity of transmit channels that are still available after the S transmit channels are disabled, or may correspond to a quantity of antenna ports. The quantity of antenna ports herein may also be understood as the quantity of antenna ports that are still available after the S transmit channels are disabled, or may be a quantity of antenna ports that are disabled after the S transmit channels are disabled. For example, the second indication information includes 2 bits. Four types of status values of the two bits respectively correspond to a shutdown level 1 to a shutdown level 4. Status values 00 (that is, the shutdown level 1) of the 2 bits correspond to the P antenna ports. Status values 01 (that is, the shutdown level 2) of the 2 bits correspond to P/2 antenna ports. Status values 10 (that is, the shutdown level 3) of the 2 bits correspond to P/4 antenna ports. Status values 11 (that is, the shutdown level 4) of the 2 bits correspond to P/8 antenna ports. For example, P is 32, and the N antenna ports are shown in FIG. 5. If the second indication information indicates that the shutdown level is 2, after receiving the second indication information, the terminal enters the mode 1. The terminal measures CSI based on an antenna port set including 16 antenna ports. In other words, the terminal measures the CSI for an antenna port set 1. If the second indication information indicates that the shutdown level is 1, after receiving the second indication information, the terminal enters the mode 2. The terminal measures CSI based on the 32 antenna ports included in the first reference signal resource. In other words, the terminal measures the CSI for an antenna port set 0.

S904: The terminal sends first information to the base station, where the first information includes M pieces of CSI that are in a one-to-one correspondence with the M antenna port sets; and correspondingly, the base station receives the first information sent by the terminal.

For detailed description of the M pieces of CSI that correspond to the M antenna port sets and that are included in the first information, refer to the related description of step S404 in FIG. 4.

The M antenna port sets herein may be protocol-predefined, or may be independently selected by the terminal. The following provides several possible examples about how the terminal selects the M pieces of CSI corresponding to the M antenna port sets and reports the M pieces of CSI to the base station.

Manner e1: The terminal measures CSI of the N antenna port sets to obtain N pieces of CSI corresponding to the N antenna port sets, selects the M pieces of CSI with optimal channel quality from the N pieces of CSI, and reports the M pieces of CSI to the base station by using the first information. In other words, the M antenna port sets are M antenna port sets with optimal channel quality in the N antenna port sets. In this embodiment of this application, the channel quality may be at least one of a CQI, RSRP, an SINR, and an RSRQ.

Manner e2: The terminal selects, from the N antenna port sets, first M antenna port sets that include largest quantities of antenna ports, to measure CSI, obtains the M pieces of CSI corresponding to the M antenna port sets, and sends the M pieces of CSI to the base station by using the first information. In this case, the terminal does not need to measure CSI corresponding to an antenna port set other than the M antenna port sets in the N antenna port sets. In other words, the M antenna port sets are M antenna port sets that include the largest quantities of antenna ports in the N antenna port sets.

Manner e3: The terminal measures CSI corresponding to one or more of the N antenna port sets, until M antenna port sets that meet a preset condition are selected or a quantity of antenna port sets on which measurement is performed reaches L, where L is a positive integer less than or equal to N. In some embodiments, L is a largest quantity of antenna port sets on which measurement that can be supported by a capability of the terminal is performed. In some embodiments, the preset condition may be that channel quality corresponding to an antenna port set is greater than a first threshold.

Manner e4: The terminal measures, in descending order of priorities of the antenna port sets, CSI corresponding to one or more of the N antenna port sets, until M antenna port sets that meet a preset condition are selected or a quantity of antenna port sets on which measurement is performed reaches L. In some embodiments, L is a largest quantity of antenna port sets on which measurement that can be supported by a capability of the terminal is performed.

It may be understood that, in this embodiment of this application, the priorities of the N antenna ports may be that a priority of an antenna port set including a larger quantity of antenna ports is higher, or may be that a priority of an antenna port set including a smaller quantity of antenna ports is higher. A rule of a priority of an antenna port set is not limited in this application.

In Manner e1 to Manner e4, a value of M may be predetermined by a protocol, or may be indicated by the base station by using signaling.

Manner e5: The terminal measures CSI of the N antenna port sets, selects, as the M antenna port sets, one or more antenna port sets that meet a preset condition, and sends, to the base station by using the first information, the M pieces of CSI corresponding to the M antenna port sets. In some embodiments, the preset condition may be that channel quality corresponding to an antenna port set is greater than a first threshold. Different from Manner e1 to Manner e4, in Manner e5, the terminal does not need to learn of the value of M in advance, but uses, as the M antenna port sets, an antenna port set corresponding to one or more pieces of CSI that meet the preset condition in the N pieces of CSI. In some embodiments, for the measurement herein, the largest quantity L of antenna port sets on which measurement that can be supported by the terminal in Manner e3 is performed may also be considered. In some embodiments, when measuring the CSI of the N antenna port sets, the terminal may perform measurement in descending order of priorities of the N antenna port sets.

When the first threshold is indicated by the base station by using signaling, the method shown in FIG. 9 further includes step S9031: The base station sends third indication information to the terminal, where the third indication information indicates the first threshold. In some embodiments, the third indication information may be carried in RRC signaling, a MAC CE, or DCI.

When the M antenna port sets are not indicated by the base station by using signaling or protocol-predefined, the M antenna port sets determined by the terminal are unknown to the base station. In this case, the terminal may determine the M antenna port sets, and report indexes of the M antenna port sets to the base station.

It should be understood that, in embodiments of this application, the terminal may alternatively report L pieces of CSI of the M antenna port sets by using the first information, where L is a positive integer greater than M. In other words, "the first information includes M pieces of channel state information CSI that are in a one-to-one correspondence with the M antenna port sets" in embodiments of this application may be replaced with "the first information includes L pieces of channel state information CSI corresponding to the M antenna port sets, where L is a positive integer".

In addition to the first reference signal resource for CSI measurement, the base station further configures a plurality of second reference signal resources for interference measurement. In this case, the first information reported by the terminal may further include one or more pieces of CSI obtained through measurement performed by the terminal based on the first reference signal resource and a second reference signal resource in the plurality of second reference signal resources, in addition to the M pieces of CSI obtained through measurement performed by the terminal based on the first reference signal resource and some other second reference signal resources in the plurality of second reference signal resources.

For example, the base station may configure one first reference signal resource for channel measurement, and configure two second reference signal resources for interference measurement. The two second reference signal resources are respectively a $1^{st}$ second reference signal resource and a $2^{nd}$ second reference signal resource. In this case, for each antenna port set, the terminal obtains one piece of CSI through measurement based on the first reference signal resource and the $1^{st}$ second reference signal resource. The terminal obtains another piece of CSI through measurement based on the first reference signal resource and the $2^{nd}$ second reference signal resource. The terminal reports 2M pieces of CSI of the M antenna port sets by using the first information.

In the foregoing embodiments provided in this application, the methods provided in embodiments of this application are described from perspectives of the base station, the terminal, and interaction between the base station and the terminal. To implement the functions in the foregoing methods provided in embodiments of this application, the base station and/or the terminal may include a hardware structure and/or a software module, and implement the foregoing functions in a form of the hardware structure, the software module, or a combination of the hardware structure and the software module. A specific function in the foregoing functions is performed by the hardware structure, the software module, or the combination of the hardware structure and the software module depends on technical solutions and design constraints.

Figure 10:
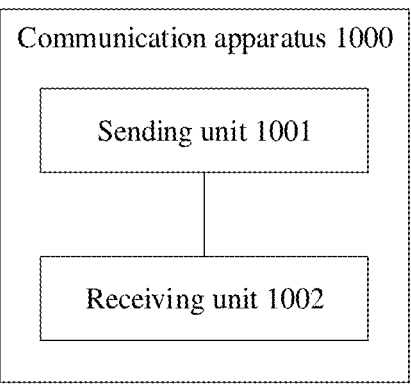
FIG. 10 is a schematic diagram of a communication apparatus according to an embodiment of this application.
Figure 11:
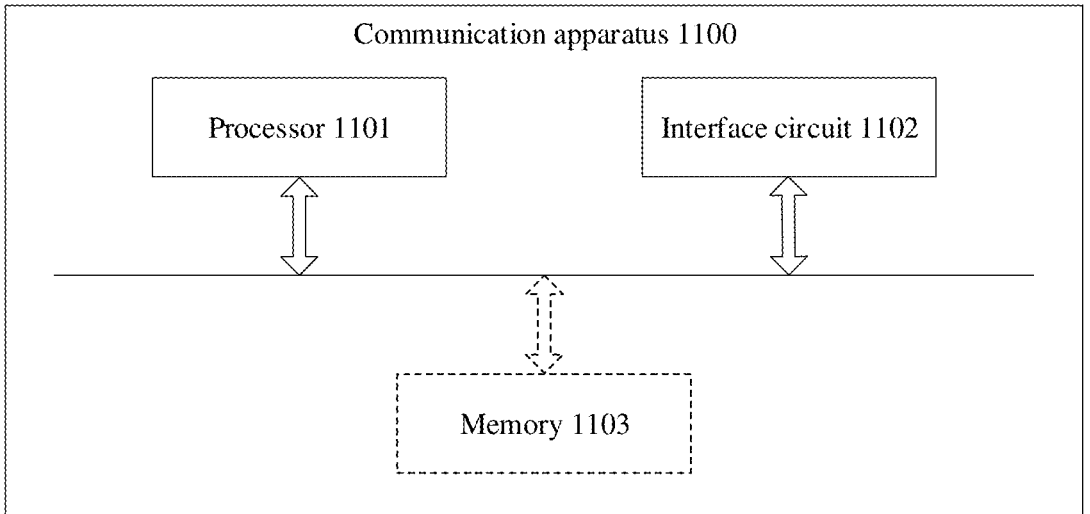
FIG. 11 is a schematic diagram of another communication apparatus according to an embodiment of this application.

FIG. 10 and FIG. 11 each are a schematic diagram of a structure of a possible communication apparatus according to an embodiment of this application. The communication apparatus may be configured to implement functions of the terminal or the base station in the foregoing method embodiments. Therefore, the communication apparatus can also implement advantageous effect of the foregoing method embodiments. In this embodiment of this application, the communication apparatus may be the terminal shown in FIG. 1, or may be the radio access network device shown in FIG. 1, or may be a module (for example, a chip) used in the terminal or the radio access network device.

As shown in FIG. 10, a communication apparatus 1000 includes a receiving module 1001 and a sending module 1002. The communication apparatus 1000 may be configured to implement the functions of the terminal or the base station in the method embodiment shown in FIG. 4 or FIG. 9. The receiving module 1001 may be a receiver, and the sending module 1002 may be a transmitter. Alternatively, the receiving module 1001 and the sending module 1002 may be a transceiver.

When the communication apparatus 1000 is configured to implement the functions of the terminal in the method embodiment in FIG. 4 or FIG. 9, the receiving module 1001 is configured to receive reference signal resource configuration information. The reference signal resource configuration information indicates a first reference signal resource. The first reference signal resource includes P antenna ports. P is a positive integer. The sending module 1002 is configured to send first information. The first information includes M pieces of CSI that are in a one-to-one correspondence with M antenna port sets. An antenna port included in any one of the M antenna port sets is an antenna port in the P antenna ports. M is a positive integer. A quantity of antenna ports included in at least one of the M antenna port sets is less than P.

When the communication apparatus 1000 is configured to implement the functions of the base station in the method embodiment in FIG. 4 or FIG. 9, the sending module 1002 is configured to send reference signal resource configuration information. The reference signal resource configuration information indicates a first reference signal resource. The first reference signal resource includes P antenna ports. P is a positive integer. The receiving module 1101 is configured to receive first information. The first information includes M pieces of CSI that are in a one-to-one correspondence with M antenna port sets. An antenna port included in any one of the M antenna port sets is an antenna port in the P antenna ports. M is a positive integer. A quantity of antenna ports included in at least one of the M antenna port sets is less than P.

As shown in FIG. 11, a communication apparatus 1100 includes a processor 1101 and an interface circuit 1102. The processor 1101 and the interface circuit 1102 are coupled to each other. It may be understood that the interface circuit 1102 may be a transceiver or an input/output interface. In some embodiments, the communication apparatus 1100 may further include a memory 1103, configured to: store instructions executed by the processor 1101, store input data required by the processor 1101 to run instructions, or store data generated after the processor 1101 runs instructions.

When the communication apparatus 1100 is configured to implement the methods in the foregoing method embodiments, the interface circuit 1102 is configured to perform functions of the receiving module 1001 and the sending module 1002.

When the communication apparatus is a chip used in a terminal, the chip in the terminal implements the functions of the terminal in the foregoing method embodiments. The chip in the terminal receives information from another module (for example, a radio frequency module or an antenna) in the terminal, and the information is sent by a base station to the terminal. Alternatively, the chip in the terminal sends information to another module (for example, a radio frequency module or an antenna) in the terminal, and the information is sent by the terminal to a base station.

When the communication apparatus is a module used in a base station, the module in the base station implements the functions of the base station in the foregoing method embodiments. The module in the base station receives information from another module (for example, a radio frequency module or an antenna) in the base station, and the information is sent by the terminal to the base station. Alternatively, the module in the base station sends information to another module (for example, a radio frequency module or an antenna) in the base station, and the information is sent by the base station to the terminal. The module in the base station herein may be a baseband chip of the base station, or may be a DU or another module. The DU herein may be a DU in an open radio access network (open radio access network, O-RAN) architecture.

It may be understood that the processor in embodiments of this application may be a central processing unit (Central Processing Unit, CPU), or may be another general-purpose processor, a digital signal processor (Digital Signal Processor, DSP), an application-specific integrated circuit (Application-Specific Integrated Circuit, ASIC), a field programmable gate array (Field Programmable Gate Array, FPGA) or another programmable logic device, a transistor logic device, a hardware component, or any combination thereof. The general-purpose processor may be a microprocessor, or may be any processor.

The steps of the methods in embodiments of this application may be implemented in a hardware manner, or may be implemented in a manner of executing software instructions by the processor. The software instructions may include a corresponding software module. The software module may be stored in a random access memory, a flash memory, a read-only memory, a programmable read-only memory, an erasable programmable read-only memory, an electrically erasable programmable read-only memory, a register, a hard disk, a removable hard disk, a CD-ROM, or any other form of storage medium well-known in the art. For example, a storage medium is coupled to the processor, so that the processor can read information from the storage medium and write information into the storage medium. Certainly, the storage medium may be alternatively a component of the processor. The processor and the storage medium may be disposed in an ASIC. In addition, the ASIC may be located in the base station or in the terminal. Certainly, the processor and the storage medium may exist in the base station or the terminal as discrete devices.

All or some of the foregoing embodiments may be implemented by software, hardware, firmware, or any combination thereof. When the software is used to implement embodiments, all or some of embodiments may be implemented in a form of a computer program product. The computer program product includes one or more computer programs or instructions. When the computer programs or instructions are loaded and executed on a computer, all or some of the procedures or functions in embodiments of this application are executed. The computer may be a general-purpose computer, a dedicated computer, a computer network, a base station, user equipment, or another programmable apparatus. The computer programs or instructions may be stored in a computer-readable storage medium, or may be transmitted from a computer-readable storage medium to another computer-readable storage medium. For example, the computer programs or instructions may be transmitted from a website, computer, server, or data center to another website, computer, server, or data center in a wired or wireless manner. The computer-readable storage medium may be any usable medium accessible by a computer, or a data storage device, such as a server or a data center, integrating one or more usable media. The usable medium may be a magnetic medium, for example, a floppy disk, a hard disk, or a magnetic tape; or may be an optical medium, for example, a digital video disc; or may be a semiconductor medium, for example, a solid state disk. The computer-readable storage medium may be a volatile or non-volatile storage medium, or may include two types of storage media: a volatile storage medium and a non-volatile storage medium.

In embodiments of this application, if there are no special statements and logic conflicts, terms and/or descriptions between different embodiments are consistent and may be mutually referenced, and technical features in different embodiments may be combined based on an internal logical relationship thereof, to form a new embodiment.

For whether an optional case is used in this specification, "and/or" describes an association relationship between associated objects and indicates that three relationships may exist. For example, A and/or B may indicate the following cases: Only A exists, both A and B exist, and only B exists, where A and B may be singular or plural. In the text description of this application, the character "/" usually indicates an "or" relationship between the associated objects. In a formula in this application, the character "/" indicates a "division" relationship between the associated objects. "Including at least one of A, B, and C" may indicate: including A; including B; including C; including A and B; including A and C; including B and C; and including A, B, and C.

It may be understood that various numbers in embodiments of this application are merely used for differentiation for ease of description, and are not used to limit the scope of embodiments of this application. The sequence numbers of the foregoing processes do not mean execution sequences. The execution sequences of the processes should be determined based on functions and internal logic of the processes.

What is claimed is:

1. A channel state information measurement method, comprising:

receiving, by a terminal device, reference signal resource configuration information, wherein the reference signal resource configuration information is useable to indicate a first reference signal resource, the first reference signal resource comprises P antenna ports, where P is a positive integer;

obtaining, by the terminal device, M pieces of channel state information (CSI) based on at least the first reference signal resource;

sending, by the terminal device, first information, wherein the first information comprises the M pieces of CSI, and the M pieces of CSI are in a one-to-one correspondence with M antenna port sets, an antenna port in any one of the M antenna port sets is in the P antenna ports, where M is a positive integer, and a quantity of antenna ports comprised in the any one of the M antenna port sets is less than P; and receiving data, by the terminal device, over a number of channels, the number of channels are adjusted based on the M pieces of CSI.

2. The method according to claim 1, further comprising:
receiving first indication information, wherein the first indication information is useable to indicate N antenna port sets, the M antenna port sets are in the N antenna port sets, an antenna port comprised in any one of the N antenna port sets is in the P antenna ports, and N is an integer greater than or equal to M.

3. The method according to claim 1, further comprising:
receiving second indication information, wherein the second indication information is useable to indicate the M antenna port sets, or the second indication information is useable to indicate X antenna ports in the P antenna ports; and an antenna port in the M antenna port sets is in the X antenna ports, or the antenna port in the M antenna port sets is in the P antenna ports except the X antenna ports.

4. The method according to claim 1, wherein
the first information comprises M first bit fields, a $K1^{th}$ first bit field in the M first bit fields is useable to indicate CSI of a first antenna port set in the M antenna port sets, a $K2^{th}$ first bit field in the M first bit fields is useable to indicate CSI of a second antenna port set in the M antenna port sets, where K1 and K2 are positive integers less than or equal to M, K1 is less than K2, and
a first quantity of antenna ports comprised in the first antenna port set is greater than or equal to a second quantity of antenna ports comprised in the second antenna port set, or
a first channel quality of the first antenna port set is higher than or equal to a second channel quality of the second antenna port set.

5. The method according to claim 1, wherein
the first information comprises M second bit fields, and the M second bit fields respectively indicate indexes of the M antenna port sets.

6. A channel state information measurement method, comprising:
sending, by a network device, reference signal resource configuration information, wherein the reference signal resource configuration information is useable to indicate a first reference signal resource, the first reference signal resource comprises P antenna ports, where P is a positive integer;
receiving, by the network device, first information, wherein the first information comprises M pieces of channel state information (CSI), the M pieces of CSI are obtained based on at least the first reference signal resource, and the M pieces of CSI are in a one-to-one correspondence with M antenna port sets, an antenna port comprised in any one of the M antenna port sets is in the P antenna ports, where M is a positive integer, and a quantity of antenna ports comprised in the any one of the M antenna port sets is less than P; and
sending data, by the network device, over a number of channels, the number of channels are adjusted based on the M pieces of CSI.

7. The method according to claim 6, further comprising:
sending first indication information, wherein the first indication information is useable to indicate N antenna port sets, the M antenna port sets are in the N antenna port sets, an antenna port comprised in any one of the N antenna port sets is in the P antenna ports, and N is a positive integer greater than or equal to M.

8. The method according to claim 6, further comprising:
sending second indication information, wherein the second indication information is useable to indicate the M antenna port sets, or the second indication information is useable to indicate X antenna ports in the P antenna ports; and an antenna port in the M antenna port sets is in the X antenna ports, or the antenna port in the M antenna port sets is in the P antenna ports except the X antenna ports.

9. The method according to claim 6, wherein
the first information comprises M first bit fields, a $K1^{th}$ first bit field in the M first bit fields is useable to indicate CSI of a first antenna port set in the M antenna port sets, a $K2^{th}$ first bit field in the M first bit fields is useable to indicate CSI of a second antenna port set in the M antenna port sets, where K1 and K2 are positive integers less than or equal to M, K1 is less than K2, and
a first quantity of antenna ports comprised in the first antenna port set is greater than or equal to a second quantity of antenna ports comprised in the second antenna port set, or
a first channel quality of the first antenna port set is higher than or equal to a second channel quality of the second antenna port set.

10. The method according to claim 6, wherein
the first information comprises M second bit fields, and the M second bit fields respectively indicate indexes of the M antenna port sets.

11. A communication apparatus, comprising a processor, wherein the processor is configured to execute non-transitory instructions to thereby cause the communications apparatus to perform:
receiving reference signal resource configuration information, wherein the reference signal resource configuration information is useable to indicate a first reference signal resource, the first reference signal resource comprises P antenna ports, where P is a positive integer;
obtaining M pieces of channel state information (CSI) based on at least the first reference signal resource;
sending first information, wherein the first information comprises the M pieces of CSI, and the M pieces of CSI are in a one-to-one correspondence with M antenna port sets, an antenna port in any one of the M antenna port sets is in the P antenna ports, where M is a positive integer, and a quantity of antenna ports comprised in the any one of the M antenna port sets is less than P; and
receiving data over a number of channels, the number of channels are adjusted based on the M pieces of CSI.

12. The communication apparatus according to claim 11, wherein the processor is further configured to further execute the non-transitory instructions to thereby further cause the communications apparatus to perform:
receiving first indication information, wherein the first indication information is useable to indicate N antenna port sets, the M antenna port sets are in the N antenna port sets, an antenna port comprised in any one of the N antenna port sets is in the P antenna ports, and N is an integer greater than or equal to M.

13. The communication apparatus according to claim 11, wherein the processor is further configured to further execute the non-transitory instructions to thereby further cause the communications apparatus to perform:

receiving second indication information, wherein the second indication information is useable to indicate the M antenna port sets, or the second indication information is useable to indicate X antenna ports in the P antenna ports; and an antenna port in the M antenna port sets is in the X antenna ports, or the antenna port in the M antenna port sets is in the P antenna ports except the X antenna ports.

14. The communication apparatus according to claim 11, wherein the first information comprises M first bit fields, a $K1^{th}$ first bit field in the M first bit fields is useable to indicate CSI of a first antenna port set in the M antenna port sets, a $K2^{th}$ first bit field in the M first bit fields is useable to indicate CSI of a second antenna port set in the M antenna port sets, where K1 and K2 are positive integers less than or equal to M, K1 is less than K2, and a first quantity of antenna ports comprised in the first antenna port set is greater than or equal to a second quantity of antenna ports comprised in the second antenna port set, or a first channel quality of the first antenna port set is higher than or equal to a second channel quality of the second antenna port set.

15. The communication apparatus according to claim 11, wherein the first information comprises M second bit fields, and the M second bit fields respectively indicate indexes of the M antenna port sets.

16. A communication apparatus, comprising a processor, wherein the processor is configured to execute non-transitory instructions to thereby cause the communications apparatus to perform:

sending reference signal resource configuration information, wherein the reference signal resource configuration information is useable to indicate a first reference signal resource, the first reference signal resource comprises P antenna ports, where P is a positive integer;

receiving first information, wherein the first information comprises M pieces of channel state information (CSI), the M pieces of CSI are obtained based on at least the first reference signal resource, and the M pieces of CSI are in a one-to-one correspondence with M antenna port sets, an antenna port comprised in any one of the M antenna port sets is in the P antenna ports, where M is a positive integer, and a quantity of antenna ports comprised in the any one of the M antenna port sets is less than P; and sending data over a number of channels, the number of channels are adjusted based on the M pieces of CSI.

17. The communication apparatus according to claim 16, wherein the processor is further configured to further execute the non-transitory instructions to thereby further cause the communications apparatus to perform:

sending first indication information, wherein the first indication information is useable to indicate N antenna port sets, the M antenna port sets are in the N antenna port sets, an antenna port comprised in any one of the N antenna port sets is in the P antenna ports, and N is a positive integer greater than or equal to M.

18. The communication apparatus according to claim 16, wherein the processor is further configured to further execute the non-transitory instructions to thereby further cause the communications apparatus to perform:

sending second indication information, wherein the second indication information is useable to indicate the M antenna port sets, or the second indication information is useable to indicate X antenna ports in the P antenna ports; and an antenna port in the M antenna port sets is in the X antenna ports, or the antenna port in the M antenna port sets is in the P antenna ports except the X antenna ports.

19. The communication apparatus according to claim 16, wherein the first information comprises M first bit fields, a $K1^{th}$ first bit field in the M first bit fields is useable to indicate CSI of a first antenna port set in the M antenna port sets, a $K2^{th}$ first bit field in the M first bit fields is useable to indicate CSI of a second antenna port set in the M antenna port sets, where K1 and K2 are positive integers less than or equal to M, K1 is less than K2, and a first quantity of antenna ports comprised in the first antenna port set is greater than or equal to a second quantity of antenna ports comprised in the second antenna port set, or a first channel quality of the first antenna port set is higher than or equal to a second channel quality of the second antenna port set.

20. The communication apparatus according to claim 16, wherein the first information comprises M second bit fields, and the M second bit fields respectively indicate indexes of the M antenna port sets.

* * * * *